US007734404B2

(12) United States Patent
Shiiba et al.

(10) Patent No.: US 7,734,404 B2
(45) Date of Patent: Jun. 8, 2010

(54) DECELERATION CONTROL APPARATUS FOR VEHICLE

(75) Inventors: Kazuyuki Shiiba, Susono (JP); Kunihiro Iwatsuki, Toyota (JP); Yukihiro Ikeda, Toyota (JP); Masayoshi Hoshino, Toyota (JP); Akira Matsui, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/338,693

(22) Filed: Jan. 25, 2006

(65) Prior Publication Data

US 2006/0190158 A1    Aug. 24, 2006

(30) Foreign Application Priority Data

Feb. 18, 2005  (JP) .............................. 2005-043194
Jul. 5, 2005   (JP) .............................. 2005-196657

(51) Int. Cl.
G05D 1/00   (2006.01)
B60T 8/24   (2006.01)
B60T 8/72   (2006.01)
B60T 8/32   (2006.01)
B60T 8/60   (2006.01)

(52) U.S. Cl. ............................ 701/70; 701/36; 701/65; 701/71; 701/72; 701/78; 701/79; 701/82; 701/83; 303/146; 303/147; 303/121; 303/139

(58) Field of Classification Search ................... 701/29, 701/36, 38, 41, 48, 90, 1, 19–23, 26, 27, 701/28, 37, 50–62, 64–72, 78, 79, 82–88, 701/91, 93–96

See application file for complete search history.

(56) References Cited

U.S. PATENT DOCUMENTS

| 4,771,657 | A |   | 9/1988 | Iwatsuki |
| 5,113,718 | A |   | 5/1992 | Sato |
| 5,420,792 | A |   | 5/1995 | Butsuen et al. |
| 5,720,690 | A |   | 2/1998 | Hara et al. |
| 5,731,977 | A |   | 3/1998 | Taniguchi et al. |
| 5,748,476 | A |   | 5/1998 | Sekine et al. |
| 5,902,345 | A |   | 5/1999 | Minowa et al. |
| 5,911,771 | A | * | 6/1999 | Reichart et al. ............ 701/65 |
| 6,067,497 | A | * | 5/2000 | Sekine et al. ............... 701/93 |

(Continued)

FOREIGN PATENT DOCUMENTS

DE         196 21 085        11/1996

(Continued)

*Primary Examiner*—Jack W. Keith
*Assistant Examiner*—Jonathan M Dager
(74) *Attorney, Agent, or Firm*—Oblon, Spivak, McClelland, Maier & Neustadt, L.L.P.

(57) ABSTRACT

A deceleration control apparatus for a vehicle including a controller that performs deceleration control based on a first target deceleration set based on a distance to a starting point of an upcoming curve, when the deceleration control for the curve is started at a position distant from the starting point of the curve; and that performs the deceleration control based on a second target deceleration set based on a lateral acceleration that is estimated to be detected when the vehicle passes the starting point of the curve, when the deceleration control for the curve is started at a position close to the starting point of the curve. With this apparatus, it is possible to perform the deceleration control that provides drive assist according to the intention of the driver and that enhances driving convenience for the driver.

14 Claims, 23 Drawing Sheets

U.S. PATENT DOCUMENTS

| | | | |
|---|---|---|---|
| 6,092,005 A * | 7/2000 | Okada | 701/1 |
| 6,125,324 A * | 9/2000 | Matsuda et al. | 701/208 |
| 6,138,084 A * | 10/2000 | Mine | 702/157 |
| 6,141,617 A * | 10/2000 | Matsuda et al. | 701/72 |
| 6,161,073 A | 12/2000 | Tange et al. | |
| 6,182,000 B1 * | 1/2001 | Ohta et al. | 701/55 |
| 6,188,316 B1 | 2/2001 | Matsuno et al. | |
| 6,199,001 B1 | 3/2001 | Ohta et al. | |
| 6,208,927 B1 | 3/2001 | Mine et al. | |
| 6,216,082 B1 | 4/2001 | Minowa et al. | |
| 6,220,986 B1 * | 4/2001 | Aruga et al. | 477/97 |
| 6,223,118 B1 | 4/2001 | Kobayashi et al. | |
| 6,287,237 B1 | 9/2001 | Graf et al. | |
| 6,353,787 B2 | 3/2002 | Nishiyama | |
| 6,392,535 B1 * | 5/2002 | Matsuno et al. | 340/441 |
| 6,401,023 B1 * | 6/2002 | Takahashi | 701/70 |
| 6,405,116 B1 | 6/2002 | Koibuchi | |
| 6,424,904 B1 * | 7/2002 | Takahashi et al. | 701/70 |
| 6,626,797 B2 | 9/2003 | Shiiba et al. | |
| 6,675,090 B2 * | 1/2004 | Matsuura | 701/200 |
| 6,778,896 B1 * | 8/2004 | Matsuura et al. | 701/70 |
| 6,868,324 B2 | 3/2005 | Matsumoto et al. | |
| 6,920,384 B2 * | 7/2005 | Shiimado et al. | 701/65 |
| 6,970,779 B2 * | 11/2005 | Kagawa et al. | 701/93 |
| 7,191,046 B2 * | 3/2007 | Kin | 701/70 |
| 2001/0004028 A1 | 6/2001 | Sato et al. | |
| 2001/0008989 A1 | 7/2001 | Minowa et al. | |
| 2002/0026276 A1 | 2/2002 | Hattori et al. | |
| 2002/0032514 A1 * | 3/2002 | Kuroda et al. | 701/96 |
| 2002/0052681 A1 * | 5/2002 | Matsuno | 701/70 |
| 2002/0173896 A1 | 11/2002 | Ishizu et al. | |
| 2003/0036839 A1 | 2/2003 | Han et al. | |
| 2003/0130780 A1 * | 7/2003 | Shiimado et al. | 701/65 |
| 2003/0163238 A1 * | 8/2003 | Matsumoto et al. | 701/70 |
| 2004/0111209 A1 * | 6/2004 | Kagawa et al. | 701/93 |
| 2005/0124458 A1 * | 6/2005 | Iwatsuki et al. | 477/34 |
| 2005/0125134 A1 | 6/2005 | Iwatsuki et al. | |
| 2005/0125137 A1 | 6/2005 | Shiiba et al. | |
| 2005/0187694 A1 | 8/2005 | Shiiba et al. | |
| 2005/0218718 A1 | 10/2005 | Iwatsuki et al. | |
| 2005/0234626 A1 | 10/2005 | Shiiba et al. | |
| 2005/0267665 A1 | 12/2005 | Iwatsuki et al. | |

FOREIGN PATENT DOCUMENTS

| | | |
|---|---|---|
| DE | 198 07 095 A1 | 8/1999 |
| DE | 199 22 242 | 12/1999 |
| DE | 100 39 920 A1 | 3/2001 |
| DE | 101 41 919 A1 | 3/2002 |
| DE | 102 16 546 A1 | 10/2002 |
| EP | 0 729 860 A2 | 9/1996 |
| EP | 0 901 929 A1 | 3/1999 |
| EP | 0 941 902 A2 | 9/1999 |
| EP | 1 044 843 A2 | 10/2000 |
| EP | 1 076 277 A2 | 2/2001 |
| EP | 1 197 684 A1 | 4/2002 |
| GB | 2 276 452 A | 9/1994 |
| JP | 2-296062 | 12/1990 |
| JP | 4-064765 | 2/1992 |
| JP | 5-240075 | 9/1993 |
| JP | 6-199156 | 7/1994 |
| JP | 7-1995 | 1/1995 |
| JP | 7-251724 | 10/1995 |
| JP | 7-306998 | 11/1995 |
| JP | 8-85362 | 4/1996 |
| JP | 8-85373 | 4/1996 |
| JP | 2503426 | 4/1996 |
| JP | 8-147598 | 6/1996 |
| JP | 8-150914 | 6/1996 |
| JP | 8-192659 | 7/1996 |
| JP | 8-194886 | 7/1996 |
| JP | 8-194889 | 7/1996 |
| JP | 8-301084 A | 11/1996 |
| JP | 9-050597 | 2/1997 |
| JP | 9-142175 | 6/1997 |
| JP | 9-229175 | 9/1997 |
| JP | 9-242863 | 9/1997 |
| JP | 9-280353 | 10/1997 |
| JP | 10-30848 | 2/1998 |
| JP | 10-038068 | 2/1998 |
| JP | 10-132072 | 5/1998 |
| JP | 10-184877 | 7/1998 |
| JP | 10-184901 | 7/1998 |
| JP | 10-185603 | 7/1998 |
| JP | 10-203203 | 8/1998 |
| JP | 10-230829 | 9/1998 |
| JP | 10-236290 | 9/1998 |
| JP | 10-264788 | 10/1998 |
| JP | 10-264791 | 10/1998 |
| JP | 10-287148 | 10/1998 |
| JP | 10-324175 | 12/1998 |
| JP | 11-63211 | 3/1999 |
| JP | 11-101141 | 4/1999 |
| JP | 11-115545 | 4/1999 |
| JP | 11-222055 | 8/1999 |
| JP | 11-278096 | 10/1999 |
| JP | 2000-27981 | 1/2000 |
| JP | 2000-39062 | 2/2000 |
| JP | 2000-43696 | 2/2000 |
| JP | 2000-046174 | 2/2000 |
| JP | 2000-127803 | 5/2000 |
| JP | 2000-145937 | 5/2000 |
| JP | 2000-168521 | 6/2000 |
| JP | 2000-233730 | 8/2000 |
| JP | 2000-0242888 | 9/2000 |
| JP | 2000-245016 | 9/2000 |
| JP | 2000-318484 | 11/2000 |
| JP | 2001-26228 | 1/2001 |
| JP | 2001-27317 | 1/2001 |
| JP | 2001-30791 | 2/2001 |
| JP | 2001-30792 | 2/2001 |
| JP | 2001-088579 | 4/2001 |
| JP | 2001-90831 | 4/2001 |
| JP | 2001-341546 | 12/2001 |
| JP | 2002-122225 | 4/2002 |
| JP | 2002-130451 | 5/2002 |
| JP | 2002-217028 | 8/2002 |
| JP | 2002-367096 | 12/2002 |
| JP | 2003-54395 | 2/2003 |
| JP | 2003-99897 | 4/2003 |
| JP | 2003-118425 | 4/2003 |
| JP | 2003-237420 | 8/2003 |
| JP | 2003-256999 | 9/2003 |
| JP | 2003-0301941 | 10/2003 |
| JP | 2004-116637 | 4/2004 |
| JP | 2004-136725 | 5/2004 |
| JP | 2005-069294 | 3/2005 |
| JP | 2005-193794 | 7/2005 |
| KR | 1997-0044795 | 7/1997 |
| KR | 1998-046906 | 9/1998 |
| KR | 10-0582491 | 5/2006 |

* cited by examiner

NODE CHART

CALCULATION OF Greqy

CALCULATION OF Greqy

FIG. 14

EXAMPLE

| VEHICLE SPEED | | | CURVATURE RADIUS R | | |
|---|---|---|---|---|---|
| | LOW | ~40Km/h | | LARGE | 130~80R |
| | MEDIUM | 41~80Km/h | | MEDIUM | 81~40R |
| | HIGH | 81Km/h~ | | SMALL | EQUAL TO OR LESS THAN 40R |

EXAMPLE OF SETTING
ESTIMATED LATERAL ACCELERATION G     UNIT (G)

| CURVATURE RADIUS R / VEHICLE SPEED | LARGE | MEDIUM | SMALL |
|---|---|---|---|
| LOW | 0.12 | 0.20 | 0.62 |
| MEDIUM | 0.50 | 0.83 | 2.51 |
| HIGH | 0.78 | 1.31 | 3.93 |

FIG. 15

EXAMPLE OF SETTING
SECOND DECELERATION Greqy     UNIT (G)

| CURVATURE RADIUS R / VEHICLE SPEED | LARGE | MEDIUM | SMALL |
|---|---|---|---|
| LOW | 0.0 | 0.0 | 0.05 |
| MEDIUM | 0.07 | 0.15 | 0.20 |
| HIGH | 0.10 | 0.20 | 0.20 |

PRESENT SHIFT SPEED DECELERATION MAP

| SHIFT SPEED \ NO | 1000 | 2000 | 3000 | 4000 |
|---|---|---|---|---|
| 5th | −0.04 | −0.05 | −0.06 | −0.07 |
| 4th | −0.05 | −0.06 | −0.07 | −0.08 |
| 3rd | −0.06 | −0.07 | −0.08 | −0.09 |

SHIFT SPEED TARGET DECELERATION

FIG. 20

SLIPPERINESS OF ROAD SURFACE

| SLIPPERINESS | VERY SLIPPERY (SNOW ROAD, FROZEN ROAD) | SLIPPERY (WET ROAD) | NOT SLIPPERY (DRY ROAD) |
|---|---|---|---|
| TARGET LATERAL ACCELERATION G | 0.25 | 0.3 | 0.4 |

RUNNING MODE DESIRED BY DRIVER

| RUNNING MODE DESIRED BY DRIVER | SLOW | NORMAL | SPORTS |
|---|---|---|---|
| TARGET LATERAL ACCELERATION G | 0.3 | 0.4 | 0.6 |

FIG. 24

DRIVING SKILL DETERMINATION TABLE

| $V_0$[Km/h] \ $L_0$[m] | $-80 < L_0 \leq 0$ | $-160 < L_0 \leq -80$ | $-240 < L_0 \leq -160$ | $L_0 \leq -240$ |
|---|---|---|---|---|
| $0 \leq V_0 < 20$ | BEGINNER | BEGINNER | BEGINNER | BEGINNER |
| $20 \leq V_0 < 60$ | INTERMEDIATE | INTERMEDIATE | BEGINNER | BEGINNER |
| $60 \leq V_0 < 100$ | SKILLED | SKILLED | INTERMEDIATE | INTERMEDIATE |
| $100 \leq V_0$ | SKILLED | SKILLED | SKILLED | INTERMEDIATE |

FIG. 25

DRIVING SKILL OF DRIVER

| DRIVING SKILL OF DRIVER | BEGINNER | INTERMEDIATE | SKILLED |
|---|---|---|---|
| TARGET LATERAL ACCELERATION G | 0.3 | 0.4 | 0.6 |

FIG. 26

RUNNING MODE DESIRED BY DRIVER AND DRIVING SKILL OF DRIVER

| RUNNING MODE DESIRED BY DRIVER \ DRIVING SKILL OF DRIVER | BEGINNER | INTERMEDIATE | SKILLED |
|---|---|---|---|
| SLOW | 0.25 | 0.3 | 0.35 |
| NORMAL | 0.35 | 0.4 | 0.45 |
| SPORTS | 0.4 | 0.5 | 0.6 |

FIG. 27

LOW ← VEHICLE SPEED V → HIGH

|  |  |  |  |
|---|---|---|---|
|  |  |  |  |
|  | Na1 | Na2 |  |
|  |  | Na3 |  |
|  |  |  |  |

TARGET DECELERATION Greqx: SMALL ↑ ↓ LARGE

LOW ← VEHICLE SPEED V → HIGH

|  | LOW | RELATIVELY LOW | RELATIVELY HIGH | HIGH |
|---|---|---|---|---|
| LARGE |  |  |  |  |
| RELATIVELY LARGE |  | Nb1 | Nb2 |  |
| RELATIVELY SMALL |  |  | Nb3 |  |
| SMALL |  |  |  |  |

CURVATURE RADIUS R: LARGE ↑ ↓ SMALL

Nb1<Nb2<Nb3

US 7,734,404 B2

DECELERATION CONTROL APPARATUS FOR VEHICLE

INCORPORATION BY REFERENCE

The disclosures of Japanese Patent Applications No. 2005-043194 filed on Feb. 18, 2005 and No. 2005-196657 filed on Jul. 5, 2005, each including the specification, drawings and abstract are incorporated herein by reference in the entireties.

BACKGROUND OF THE INVENTION

1. Field of the Invention

The invention relates to a deceleration control apparatus for a vehicle.

2. Description of the Related Art

There are known technologies for performing deceleration control for a vehicle based on information concerning the configuration of the road ahead of a host vehicle (e.g. the curvature radius of an upcoming curve, and the distance between the host vehicle and the starting point of the curve).

Each of Japanese Patent Application Publication No. JP-A-08-194889 and Japanese Patent Application Publication No. JP-A-2003-202071 describes the technology related to a control apparatus for dealing with the state of the road ahead of a host vehicle. Japanese Patent Application Publication No. JP-A-08-194889 describes the technology in which there are provided determining means, and alarm means. When recognizing that there is a curve in the road ahead of the vehicle based on the road information stored in advance, the determining means determines whether the present vehicle speed is too high for the host vehicle to appropriately go round this upcoming curve. The alarm means raises an alarm, if the determining means determines that the present vehicle speed is too high. The determining means is configured to determine the degree to which the present vehicle speed exceeds the appropriate vehicle speed for the upcoming curve, if the present vehicle speed is too high for the host vehicle to appropriately go round the upcoming curve. The alarm means is configured to raise different types of alarms depending on the degree to which the present vehicle speed exceeds the appropriate vehicle speed for the upcoming curve. With this technology, the driver can recognize the degree to which the present vehicle speed exceeds the appropriate vehicle speed for the upcoming curve depending on the type of an alarm.

Japanese Patent Application Publication No. JP-A-08-194889 merely describes an alarm device that raises an alarm based on the degree to which the present vehicle speed exceeds the appropriate vehicle speed for the upcoming curve. This publication does not describe the technology where deceleration control is performed using the deceleration calculated based on the distance to the starting point of the upcoming curve, the curvature radius of the curve, and the present vehicle speed. Namely, although Japanese Patent Application Publication No. JP-A-08-194889 describes the vehicle speed control (e.g. downshift control and throttle control), the vehicle speed control is basically performed just to urge the driver to decelerate the vehicle by means other than voice if the driver does not decelerate the vehicle even after an alarm is raised by voice (this publication merely describes the technology where, if the degree, to which the present vehicle speed exceeds the appropriate vehicle speed for the upcoming curve, is equal to or higher than a predetermined degree, the shift speed is reduced by one level). This publication does not describe the technology for performing the deceleration control based on the deceleration calculated as a value variable based on the curvature radius of the upcoming curve, and the like.

It is desirable that the deceleration control provide drive assist according to an intention of the driver and enhance driving convenience for the driver.

SUMMARY OF THE INVENTION

It is an object of the invention to provide a deceleration control apparatus for a vehicle that performs the deceleration control to provide drive assist according to an intention of the driver and to enhance driving convenience for the driver.

A first aspect of the invention relates to a deceleration control apparatus for a vehicle including a controller that performs deceleration control based on a first target deceleration set based on the distance to the starting point of an upcoming curve, when the deceleration control for the curve is started at a position distant from the starting point of the curve, and that performs the deceleration control based on a second target deceleration set based on a lateral acceleration that is estimated to be detected when the vehicle passes the starting point of the curve, when the deceleration control for the curve is started at a position close to the starting point of the curve.

A second aspect of the invention relates to a deceleration control apparatus for a vehicle including a controller that performs deceleration control for an upcoming curve. The controller includes a detector that detects the distance to the starting point of the curve, and determines whether the deceleration control is performed based on a first target deceleration or a second target deceleration depending on the distance to the starting point of the curve, which is detected when the deceleration control is started.

A third aspect of the invention relates to a deceleration control apparatus for a vehicle including a controller that selects one of a first target deceleration set based on the distance to the starting point of an upcoming curve and a second target deceleration set without taking the distance to the starting point of the curve into account, and that performs deceleration control based on the target deceleration selected from the first target deceleration and the second target deceleration.

A fourth aspect of the invention relates to a deceleration control apparatus for a vehicle including a controller that performs the deceleration control for an upcoming curve. The controller sets a first lower limit input rotational speed to the lower limit of an input rotational speed of a continuously variable transmission, which corresponds to a first target deceleration set based on the distance to the starting point of the curve; sets a second lower limit input rotational speed to the lower limit of an input rotational speed of the continuously variable transmission, which corresponds to a second target deceleration set based on a lateral acceleration that is estimated to be detected when the vehicle passes the starting point of the curve; and controls the continuously variable transmission based on the minimum value selected from the first lower limit input rotational speed and the second lower limit input rotational speed.

With the deceleration control apparatus for a vehicle described above, it is possible to provide the drive assist according to an intention of the driver and enhance driving convenience for the driver.

BRIEF DESCRIPTION OF THE DRAWINGS

The features, advantages thereof, and technical and industrial significance of this invention will be better understood by reading the following detailed description of the example embodiments of the invention, when considered in connection with the accompanying drawings, in which:

FIG. 14 illustrates the map used for obtaining the estimated lateral acceleration G in the deceleration control apparatus for a vehicle according to a fourth modified example of the first embodiment of the invention;

FIG. 15 illustrates the map used for obtaining the second deceleration used in the deceleration control apparatus according to a fifth modified example of the first embodiment of the invention;

FIG. 20 illustrates the map showing the target lateral acceleration G corresponding to the degrees of slipperiness of the road surface, which is used in the deceleration control apparatus for a vehicle according to the third embodiment of the invention;

FIG. 24 illustrates the map for estimating the driving skill of the driver, which is used in the deceleration control apparatus for a vehicle according to the third embodiment of the invention;

FIG. 25 illustrates the map showing the target lateral acceleration G corresponding to the levels of driving skill, which is used in the deceleration control apparatus for a vehicle according to the third embodiment of the invention;

FIG. 26 illustrates the map showing the target lateral acceleration G corresponding to each combination of the level of driving skill and running mode desired by the driver, which is used in the deceleration control apparatus for a vehicle according to the third embodiment of the invention;

FIG. 27 illustrates the first map conventionally suggested for the deceleration control apparatus for a vehicle according to a fourth embodiment of the invention;

FIG. 28 illustrates the second map conventionally suggested for the deceleration control apparatus for a vehicle according to the fourth embodiment of the invention;

DETAILED DESCRIPTION OF THE EXAMPLE EMBODIMENTS

Figure 1:
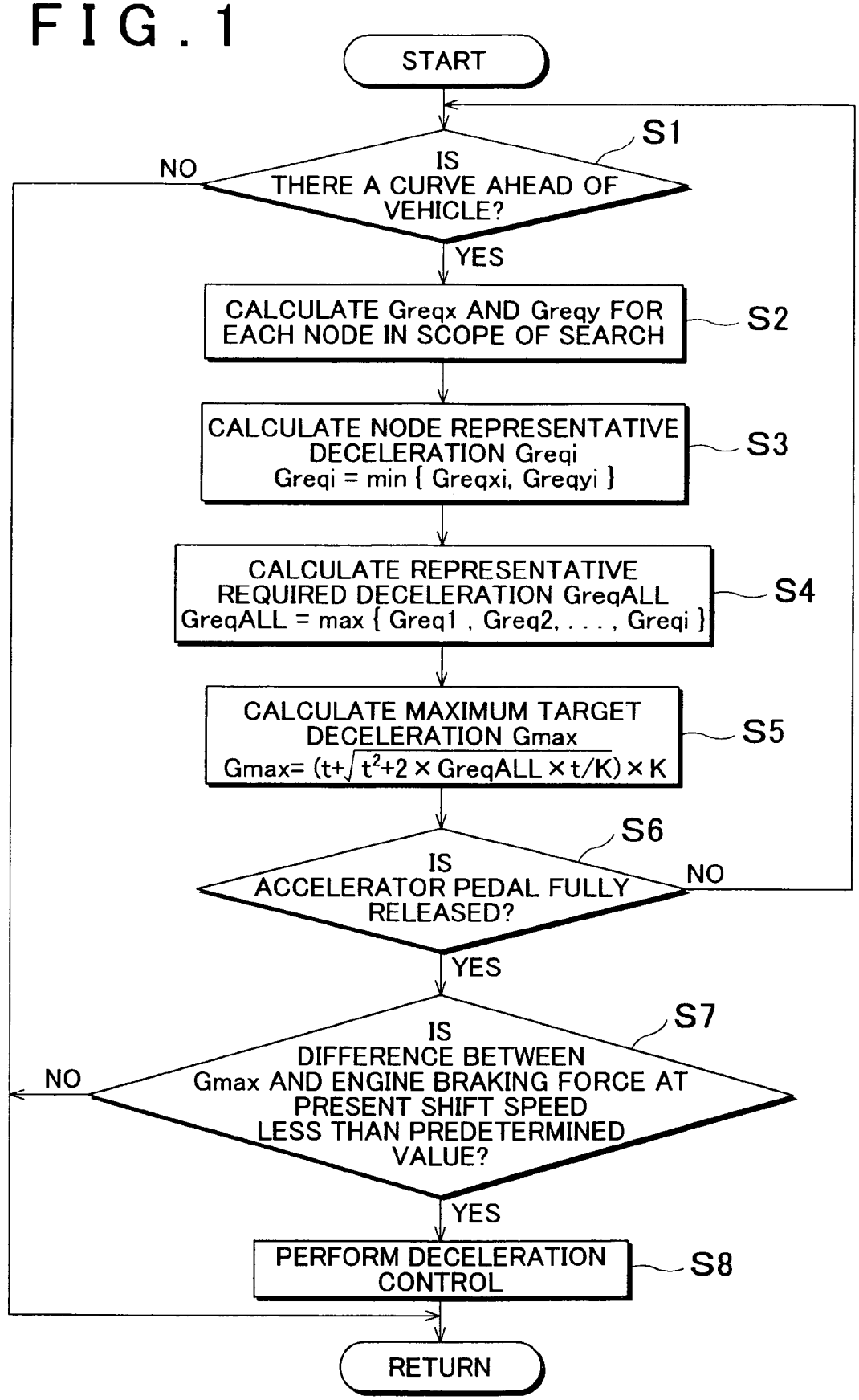
FIG. 1 illustrates the flowchart showing the control routine performed by the deceleration control apparatus for a vehicle according to a first embodiment of the invention.

In the following description and the accompanying drawings, the present invention will be described in more detail with reference to example embodiments.

A first embodiment of the invention will be described with reference to FIGS. 1 to 11. The first embodiment relates to a deceleration control apparatus for a vehicle that performs deceleration control using a brake (a brake device).

The first embodiment relates to the deceleration control apparatus that performs the control for reducing the vehicle speed to the appropriate vehicle speed for the vehicle to go round an upcoming curve (recommended vehicle speed), when the curve is detected in the road ahead of the vehicle and an intention of the driver to reduce the vehicle speed is detected. According to the first embodiment, when the distance between the vehicle and the starting point of the curve is long, the deceleration control is performed based on a first target deceleration that is set using the parameters including the distance to the starting point of the curve. On the other hand, when the distance between the vehicle and the starting point of the curve is short, the deceleration control is performed based on a second target deceleration that is set independently of the parameter of the distance to the starting point of the curve.

Namely, the deceleration control apparatus for a vehicle according to the first embodiment performs the deceleration control based on the first target deceleration that is set based on the distance to the starting point of the curve, when the deceleration control for the curve is started at a position distant from the starting point of the curve. On the other hand, the deceleration control apparatus performs the deceleration control based on the second target deceleration that is set independently of the distance to the starting point of the curve, when the deceleration control for the curve is started at a position near the starting point of the curve. Here, the time "when the deceleration control for the curve is started" signifies the time when a curve is detected in the road ahead of the vehicle and an intention of the driver to reduce the vehicle speed is detected (i.e., when an affirmative determination is made in step S6 in FIG. 1), or the time when the deceleration due to the corner control starts to act on the vehicle (the time when step S8 is started in FIG. 1).

The deceleration control is performed based on one of the first target deceleration and the second target deceleration that are calculated using different parameters, depending on whether the distance between the vehicle and the starting point of the curve is long or short. More specifically, when the vehicle is at a position distant from the starting point of the curve, the deceleration control is performed based on the first target deceleration that is set based on the present vehicle speed, the recommended vehicle speed that should be achieved when the vehicle passes the starting point of the curve, and the distance to the starting point of the curve. On the other hand, when the vehicle is at a position near the starting point of the curve, the deceleration control is performed based on the second target deceleration that is set based on the lateral acceleration that is estimated to be obtained if the vehicle passes the starting point of the curve at the present vehicle speed. It is, therefore, possible to provide the drive assist according to an intention of the driver, and enhance driving convenience for the driver.

The first embodiment also relates to the method for calculating the target deceleration used in the deceleration control (corner control) for the upcoming curve in the road ahead of the vehicle. First, the commonly employed method for calculating the target deceleration used in the corner control will be described with reference to FIG. 3.

Figure 3:
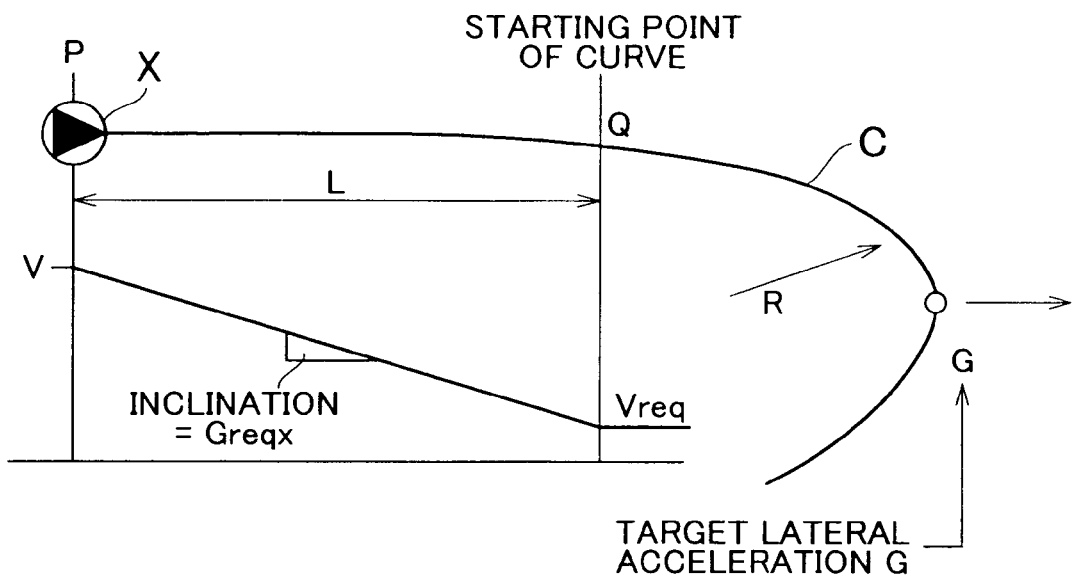
FIG. 3 illustrates the view for describing the method of calculating the target deceleration used in a common deceleration control apparatus for a vehicle.

In FIG. 3, a reference character X denotes the vehicle, a reference character P denotes the present position of the vehicle X, and a reference character C denotes the upcoming curve in the road ahead of the vehicle X. Also, a reference character Q denotes the starting point of the curve C, a reference character R denotes the curvature radius of the curve C, a reference character L denotes the distance between the present point P of the vehicle X and the starting point Q of the curve C, a reference character V denotes the present vehicle speed of the vehicle X, a reference character Vreq denotes the recommended vehicle speed for the vehicle X to go round the curve C at a target lateral acceleration Q and a reference character Greqx denotes the deceleration that is necessary for reducing the present vehicle speed V of the vehicle X to realize the recommended vehicle speed Vreq at the starting point Q of the curve C (the target deceleration that needs to act on the vehicle in the corner control).

In this case, the target lateral acceleration G is the target value indicating the lateral acceleration G at which the vehicle V should go round the curve C. The target lateral acceleration G is a predetermined value of 0.3 G to 0.4 G.

The recommended vehicle speed Vreq (m/s) is obtained according to the following equation (1).

$$Vreq = \sqrt{R \times Gyt \times g} \quad (1)$$

Here, "R" indicates the curvature radius R (m), "Gyt" indicates the compatible value (e.g. 0.4 G) of the target lateral acceleration G, and "g" indicates the gravitational acceleration.

R: curvature radius R (m).

Gyt: compatible value (e.g. 0.4 G) of target lateral acceleration G g: gravitational acceleration 9.8 (m/s$^2$)

The target deceleration Greqx is obtained according to the following equation (2).

$$Gregx = \frac{V^2 - Vreq^2}{2 \times L \times g} \quad (2)$$

Here, "V" indicates the present vehicle speed (m/s), and "L" indicates the distance between the vehicle and the starting point of the curve (m)

V: present vehicle speed (m/s)

L: distance between vehicle and starting point of curve (m)

Figure 4:
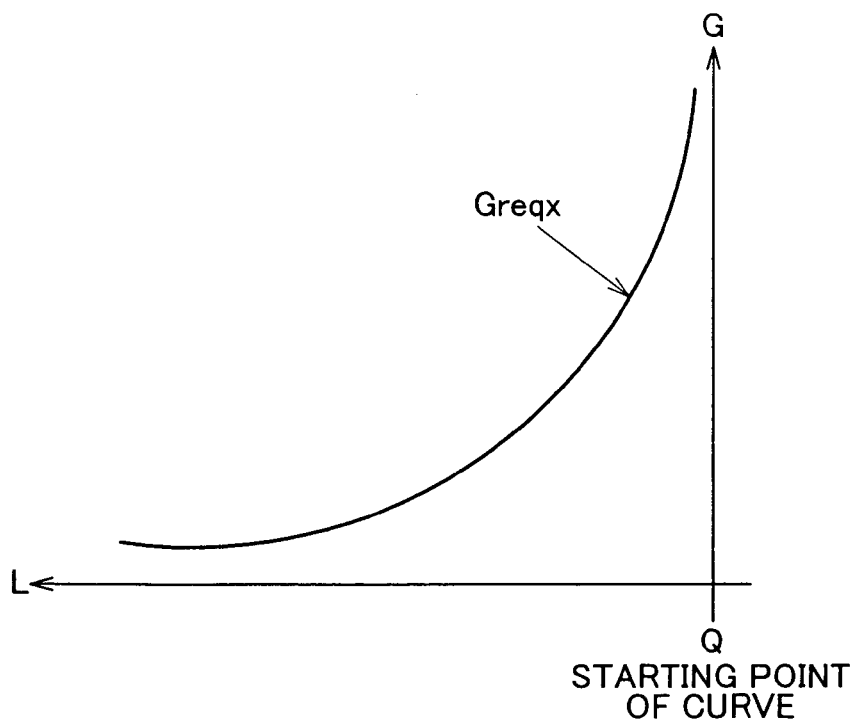
FIG. 4 illustrates the graph showing the target deceleration calculated according to the method described in FIG. 3.

FIG. 4 illustrates the relationship between the distance L between the present point P of the vehicle X and the starting point Q of the curve C, and the target deceleration Greqx obtained according to the equation 2. According to the equation 2, because the term including the distance L is the denominator, even if the present vehicle speed V slightly exceeds the recommended vehicle speed Vreq, when the distance L is short, the target deceleration Greqx comes closer to an infinite value. Accordingly, when the distance L is short, if the deceleration control is performed such that the target deceleration Greqx acts on the vehicle, the driver feels a sense of discomfort.

As shown in FIG. 4, when the distance L is relatively long, because the target deceleration Greqx does not become excessively greater than the actually required value, performing deceleration control such that the target deceleration Greqx acts on the vehicle does not raise a problem. In contrast, when the distance L is short, because the target deceleration Greqx becomes excessively greater than the actually required value, performing the deceleration control based on the target deceleration Greqx is not appropriate. Namely, performing the deceleration control based only on the target deceleration Greqx obtained according to the equation 2 is not appropriate.

When the distance L is relatively short, the target deceleration needs to be corrected. The first embodiment is made mainly to solve such a problem.

As described below in detail, the deceleration control apparatus according to the first embodiment includes means for detecting the information concerning the configuration of the road ahead of the vehicle (e.g. the curvature radius R, and the distance between the vehicle and the starting point of the curve); and at least one deceleration control device that can control the deceleration of the vehicle, such as an automatic brake actuator, a regenerative brake, an automatic transmission which can perform downshift control, and an electronic control throttle.

Figure 2:
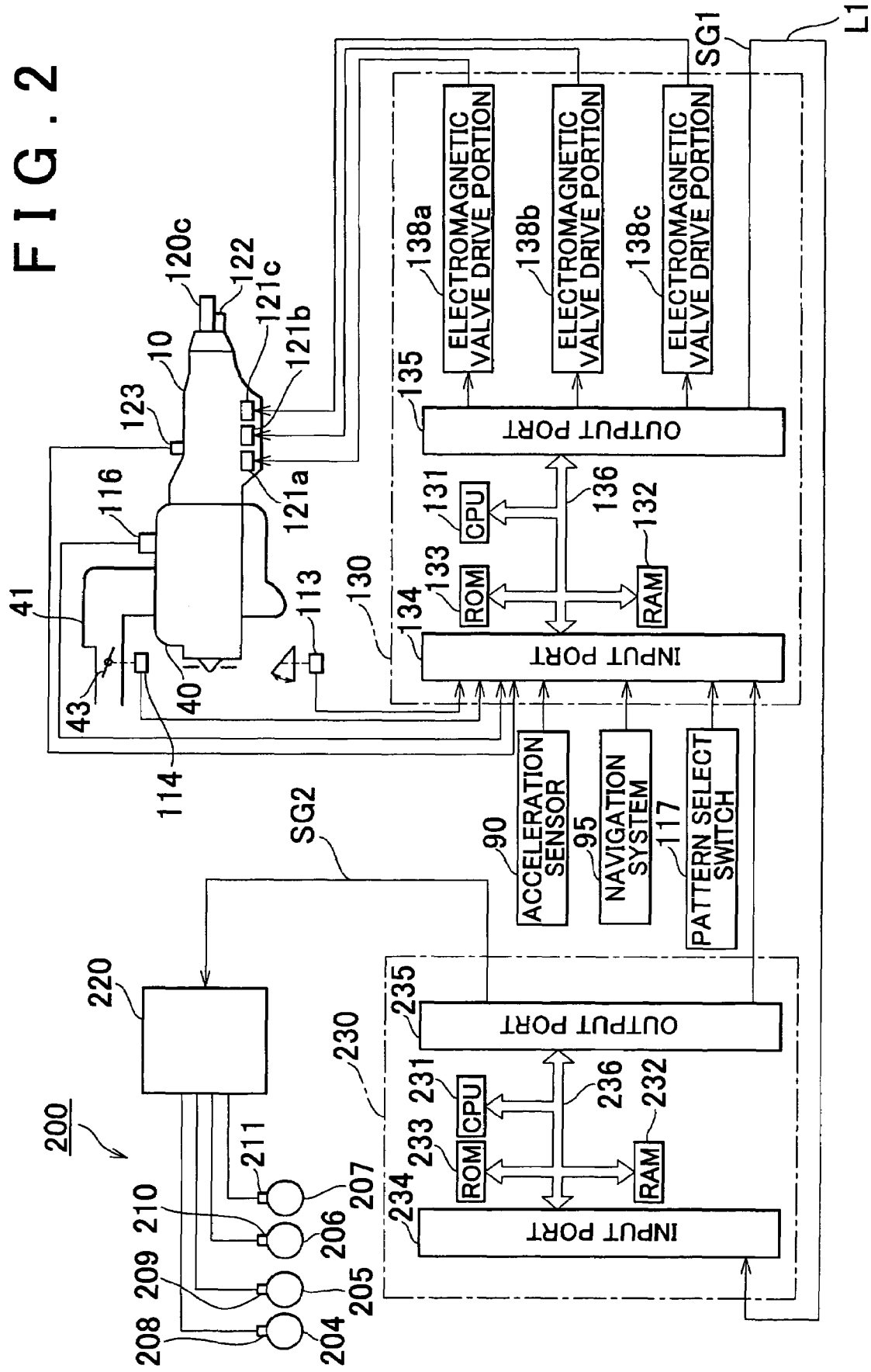
FIG. 2 illustrates the schematic diagram of the deceleration control apparatus for a vehicle according to the first embodiment of the invention.

In FIG. 2, a reference numeral 10 denotes a stepped automatic transmission, a reference numeral 40 denotes an engine, and a reference numeral 200 denotes a brake apparatus. In the automatic transmission 10, the hydraulic pressure is controlled by permitting/interrupting electric power supply to electromagnetic valves 121a, 121b and 121c, whereby the shift speed can be changed among five shift speeds. FIG. 2 shows the three electromagnetic valves 121a, 121b and 121c. However, the number of the electromagnetic valves is not limited to three. The electromagnetic valves 121a, 121b and 121c are driven according to signals from a control circuit 130.

An accelerator pedal operation amount sensor 113 detects the operation amount of an accelerator pedal. A throttle valve opening amount sensor 114 detects the opening amount of a throttle valve 43 provided in an intake passage 41 of the engine 40. An engine speed sensor 116 detects the speed of the engine 40. A vehicle speed sensor 122 detects the rotational speed of an output shaft 120c of the automatic transmission 10, which is proportional to the vehicle speed. A shift position sensor 123 detects the position of a shift lever. A pattern select switch 117 is used to provide an instruction concerning the shift pattern. An accelerator sensor 90 detects the deceleration of the vehicle.

The basic function of a navigation system 95 is to guide the host vehicle to a predetermined destination. The navigation system 95 includes a processor; an information storing medium that stores the information necessary for the vehicle to run (e.g. maps, straight roads, curves, uphill slopes, downhill slopes, and highways); a first information detecting device that detects the present position of the host vehicle and the road state by self-contained navigation, and that includes a terrestrial magnetism sensor, a gyro compass and a steering sensor; and a second information detecting device that detects the present position of the host vehicle and the road state by radio navigation, and that includes a GPS antenna, a GPS receiver, and the like.

The control circuit 130 receives signals indicating the results of detection performed by the accelerator pedal opening amount sensor 113, the throttle valve opening amount sensor 114, the engine speed sensor 116, the vehicle speed sensor 122, the shift position sensor 123, and the acceleration sensor 90. The control circuit 130 also receives the signal indicating the ON/OFF state of the pattern select switch 117, and the signal transmitted from the navigation system 95.

The control circuit 130 is formed of a known microcomputer, and includes a CPU 131, RAM 132, ROM 133, an input port 134, an output port 135 and a common bus 136. The control circuit 130 receives, through the input port 134, the signals from the accelerator pedal opening amount sensor 113, the throttle valve opening amount sensor 114, the engine speed sensor 116, the shift position sensor 123, and the acceleration sensor 90, the signal from the pattern select switch 117 and the signal from the navigation system 95. Electromagnetic valve drive portions 138a, 138b and 138c, and a braking force signal line L1 are connected to the output port 135. The braking force signal line L1 connects the output port 135 to a brake control circuit 230. A braking force signal SG1 is transmitted through the braking force signal line L1.

Figure 6:
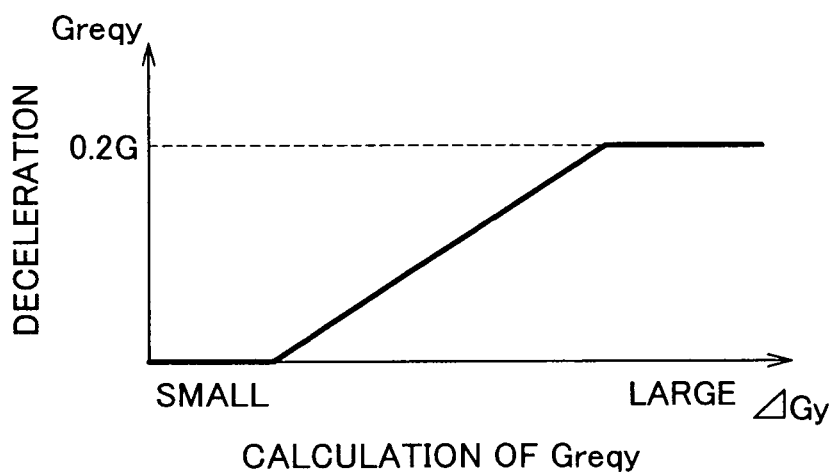
FIG. 6 illustrates the graph for describing the method for obtaining the second deceleration used in the deceleration control apparatus for a vehicle according to the first embodiment of the invention.

The control routine shown (steps of the control) in the flowchart in FIG. 1 and the map in FIG. 6 are stored in the ROM 133 in advance. The control routine of the shift control (not shown) is also stored in the ROM 133. The control circuit 130 changes the shift speed of the automatic transmission 10 based on the received various signals.

The brake apparatus 200 is controlled by the brake control circuit 230 that receives the braking force signal SG1 from the control circuit 130, thereby applying a braking force to the vehicle. The brake apparatus 200 includes a hydraulic control circuit 220; and brake devices 208, 209, 210 and 211 that are provided for wheels 204, 205, 206 and 207, respectively. The brake hydraulic pressure supplied to each of the brake devices 208, 209, 210 and 211 is controlled by the hydraulic control circuit 220. Thus, the brake devices 208, 209, 210 and 211 control the braking force applied to the wheels 204, 205, 206 and 207, respectively. The hydraulic control circuit 220 is controlled by the brake control circuit 230.

The hydraulic control circuit 220 controls the brake hydraulic pressure supplied to the brake devices 208, 209, 210 and 211 according to a brake control signal SG2, thereby performing the brake control. The brake control signal SG2 is prepared by the brake control circuit 230 according to the braking force signal SG1. The braking force signal SG1 is output from the control circuit 130 for the automatic transmission 10, and input in the brake control circuit 230. The braking force, applied to the vehicle when the brake control is performed, is set according to the brake control signal SG2 that is prepared by the brake control circuit 230 based on various data included in the braking force signal SG1.

The brake control circuit 230 is formed of a known microcomputer. The brake control circuit 230 includes a CPU 231, RAM 232, ROM 233, an input port 234, an output port 235, and a common bus 236. The hydraulic control circuit 220 is connected to the output port 235. The ROM 233 stores the routine used when the brake control signal SG2 is prepared based on the various data included in the braking force signal SG1. The brake control circuit 230 controls the brake apparatus 200 based on the received various data.

Next, the control routine performed by the deceleration control apparatus according to the first embodiment will be described with reference to FIG. 1. In step S1 in FIG. 1, the control circuit 130 determines whether there is a curve in the road ahead of the vehicle. The control circuit 130 makes a determination in step S1 according to the signal received from the navigation system 95. If it is determined in step S1 that there is a curve in the road ahead of the vehicle, the control circuit 130 performs step S2. On the other hand, if it is determined in step S1 that there is not a curve in the road ahead of the vehicle, the control circuit 130 ends the routine. In the example shown in FIG. 3, since there is the curve C in the road ahead of the vehicle X, the control circuit 130 performs step S2. In step S2 and the following steps, the target deceleration, used in the deceleration control performed when the vehicle passes the starting point of the curve C, is obtained.

In step S2, the control circuit 130 obtains the first deceleration Greqx and the second deceleration Greqy for each of the nodes located within the scope of a search (this scope is arbitrarily set, and corresponds, for example, to the area within 150 meters ahead of the vehicle) set by the navigation system 95. The first deceleration Greqx is obtained based on the present vehicle speed V, and curvature radius R at each node and the distance L between the host vehicle and each node that are supplied from the navigation system 95. The second deceleration Greqy is obtained based on the difference between the target lateral acceleration G and the estimated lateral acceleration G.

Figure 5:
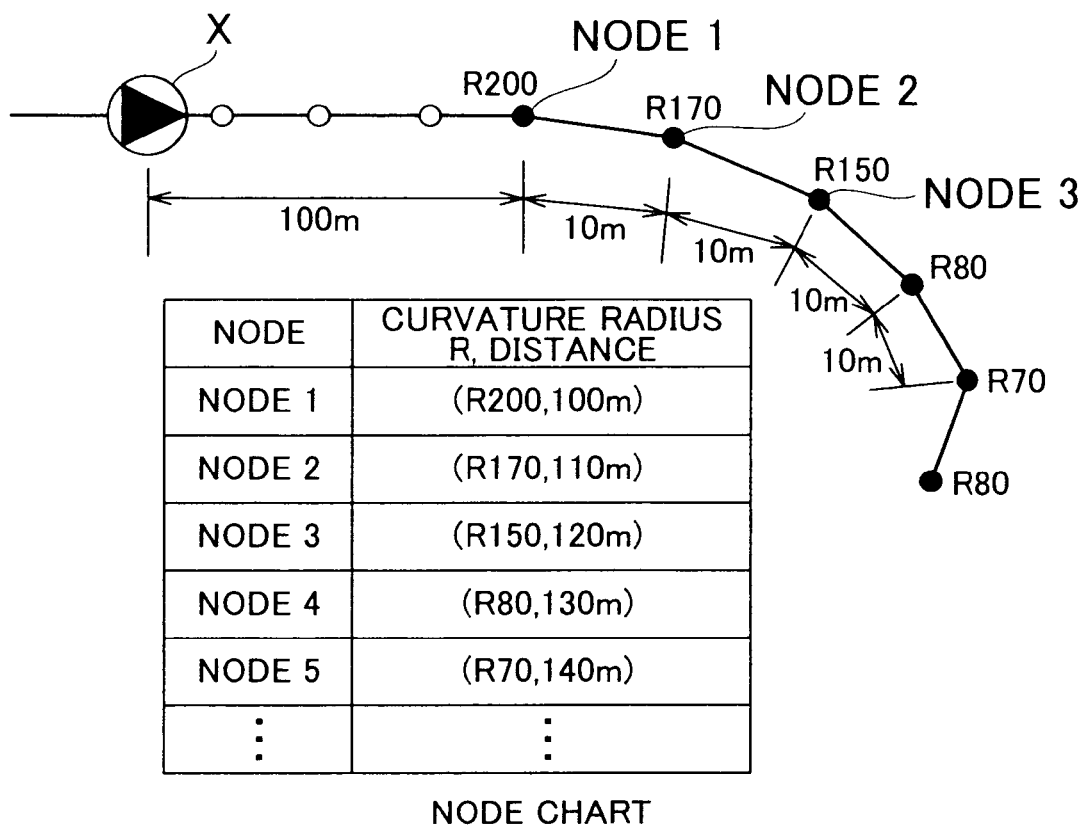
FIG. 5 illustrates the view for describing the nodes in the road information stored in a navigation system of the deceleration control apparatus for a vehicle according to the first embodiment of the invention.

As shown in FIG. 5, the navigation system 95 stores, as the map information, the data concerning the configuration of the road ahead of the vehicle, for example, the curvature radius R at each node and the distance L between the host vehicle and each node. In the example in FIG. 5, the curvature radius R at a node 1 is 200 meters and the distance L between the host vehicle and the node 1 is 100 meters. The curvature radius R at a node 2 is 170 meters, and the distance L between the host vehicle and the node 2 is 110 meters. The curvature radius R at the node 3 is 150 meters, and the distance L between the host vehicle and the node 3 is 120 meters. The curvature radius R of a target node is set to the radius of the arc that is defined by the three nodes consisting of the target node (for example, the node 2 in FIG. 5), and the nodes immediately before and after the target node (in this example, the node 1 and the node 3).

Here, the first deceleration Greqx is obtained according to the above-mentioned equations 1 and 2. When the first deceleration Greqx is obtained, in the equation 1, "R" is the curvature radius R at each node. In the equation 2, "L" is the distance between the host vehicle and each node.

The second deceleration Greqy is expressed by the following equation 3.

$$\text{Greqy} = f\{\Delta Gy\} \quad (3)$$

$\Delta Gy$: difference between target lateral acceleration G and estimated lateral acceleration G $\Delta Gy = Gyf - Gyt$ The estimated lateral acceleration G signifies the lateral acceleration that is estimated to be detected when the vehicle passes the starting point of the curve C at the present vehicle speed V. If the estimated lateral acceleration G is Gyf, the estimated lateral acceleration Gyf is obtained according to the following equation 4.

$$Gyf = \frac{V^2}{R \times g} \quad (4)$$

In the first embodiment, the lateral acceleration difference $\Delta Gy$ is used as the index when the target deceleration is obtained, because the degree to which the vehicle X needs to decelerate before reaching the starting point of the curve C can be roughly obtained based on the lateral acceleration difference $\Delta Gy$.

For example, the second deceleration Greqy can be obtained based on the lateral acceleration difference $\Delta Gy$ according to the predetermined relationship (map) as shown in FIG. 6. The relationship between the second deceleration Greqy and the lateral acceleration difference $\Delta Gy$ is set in advance based on the results of experiments, experience, and the like. If the target deceleration is theoretically obtained, the term including the distance L is used as shown in the equation 2. As a result, a problem arises, that is, when the distance L is short, the target deceleration becomes excessive (comes closer to an infinite value). To avoid such a problem, in the first embodiment, the lateral acceleration difference $\Delta Gy$ is used, because the lateral acceleration difference $\Delta Gy$ is a parameter independent of the distance L, and can be used an appropriate index when the target deceleration is obtained.

Figure 7:
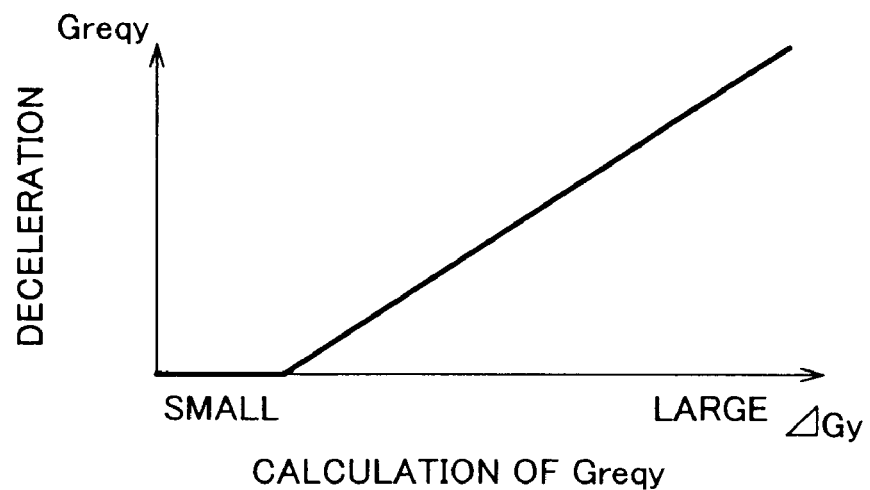
FIG. 7 illustrates another graph for describing the method for obtaining the second deceleration used in the deceleration control apparatus for a vehicle according to the first embodiment of the invention.

As shown in FIG. 6, as the lateral acceleration difference $\Delta Gy$ increases, the second deceleration Greqy is set to a greater value, because the degree to which the vehicle needs to decelerate before reaching the starting point of the curve is higher. On the other hand, as the lateral acceleration difference $\Delta Gy$ decreases, the second deceleration Greqy is set to a less value, because the degree to which the vehicle needs to decelerate before reaching the starting point of the curve is lower. When the lateral acceleration difference $\Delta Gy$ is equal to or less than the predetermined value, the second deceleration Greqy is set to zero. When the vehicle passes the starting point of the curve at a vehicle speed slightly higher than the recommended vehicle speed Vreq (when the lateral acceleration difference $\Delta Gy$ is equal to or less than the predetermined value), the vehicle can go round the curve without problems. In such a case, therefore, the second deceleration Greqy is not caused. Here, the upper limit of the deceleration may be set, for example, based only on the curvature radius R that is a parameter independent of the distance L, instead of the lateral acceleration difference $\Delta Gy$ (see FIG. 12 in Japanese Patent Application Publication No. JP-A-2003-202071). However, as described above, the lateral acceleration difference $\Delta Gy$ reflects the running state of the vehicle (vehicle speed). In contrast, if the upper limit of the deceleration is set based only on the curvature radius R, the running state of the vehicle is not reflected. Accordingly, it is more appropriate to set the second deceleration Greqy based on the lateral acceleration difference $\Delta Gy$. In FIG. 6, when the lateral acceleration difference $\Delta Gy$ is equal to or greater than the predetermined value, the second deceleration Greqy is set so as not to exceed the predetermined value (0.2 G). Instead of this, as shown in FIG. 7, the second deceleration Greqy may be set to a greater value as the lateral acceleration difference $\Delta Gy$ increases, without setting the upper limit for the second deceleration Greqy. After step S2 is completed, step S3 is performed.

In step S3, the control circuit 130 selects the minimum value from among the first deceleration Greqx and the second deceleration Greqy that are obtained in step S2 (selects the value at which the degree of deceleration is lower), as expressed by the following equation 5, and sets a representative deceleration Greqi at the target node to the value thus selected. This step is performed on all the nodes within the scope of the search. After step S3 is completed, step S4 is performed.

$$\text{Greqi} = \min\{\text{Greqx}, \text{Greqy}\} \quad (5)$$

In step S4, the control circuit 130 selects the maximum value from among the representative decelerations Greqi corresponding to the nodes in the scope of the search (selects the value at which the degree of deceleration is the highest), as expressed by the following equation 6, and sets a representative required deceleration GreqALL in the scope of the search to the thus selected value. After step S4 is completed, step S5 is performed.

$$\text{GreqALL} = \max\{\text{Greq1}, \text{Greq2}, \ldots, \text{Greqi}\} \quad (6)$$

Figure 8:
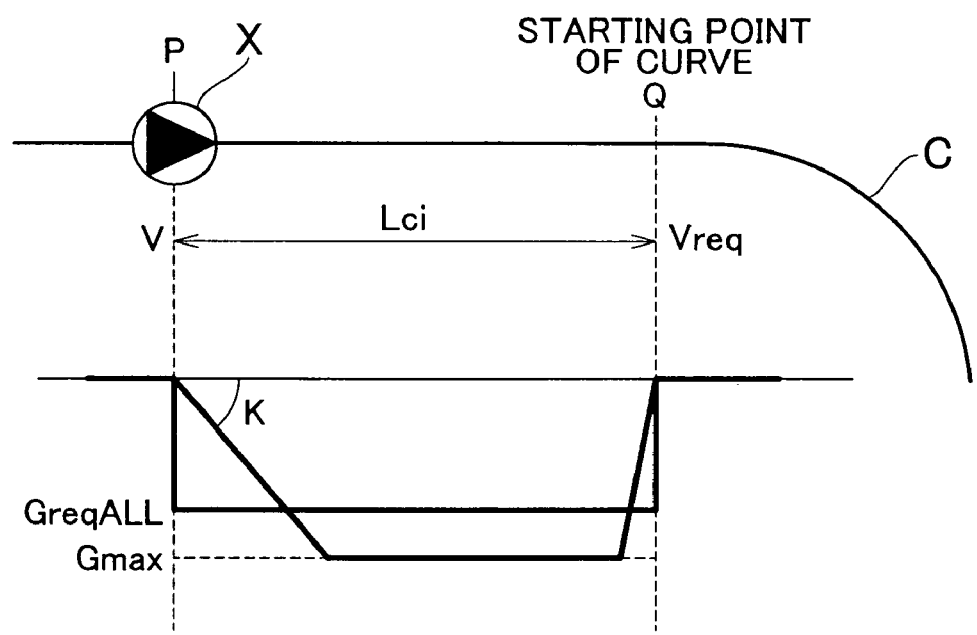
FIG. 8 illustrates the view for describing the method for obtaining the maximum target deceleration used in the deceleration control apparatus for a vehicle according to the first embodiment of the invention.

In step S5, the control circuit 130 sets the inclination and the maximum value (maximum target deceleration) of the target deceleration based on the representative required deceleration GreqALL obtained in step S4. If the representative required deceleration GreqALL is applied to the vehicle without correction, the deceleration rapidly increases, causing the driver to feel a sense of discomfort. Therefore, as shown in FIG. 8, the target deceleration is increased at a predetermined inclination K. The inclination K of the increase in the target deceleration is not a theoretical value but a compatible value that is obtained based, for example, on results of experiments and experience. The inclination K may be variable based on the running conditions such as the vehicle speed, slipperiness of the road surface, and the running mode desired by the driver (whether the driver prefers the sports running mode or the normal running mode).

The maximum target deceleration with the inclination K of the increase in the target deceleration taken into account is calculated. When the inclination of the increase in the target deceleration is "K", and the distance between the host vehicle and the starting point of the curve is Lci, the maximum target deceleration Gmax can be obtained according to the following equation 7.

$$G\max = (t + \sqrt{t^2 + 2 \times GreqALL \times t/K}) \times K \qquad (7)$$

Here, $t = (V - Vreq)/(GreqALL \times g)$

According to the equation 7, the maximum target deceleration Gmax is obtained such that the area of the rectangle where the line indicating the representative required deceleration GreqALL is used as the height and the line indicating the distance Lci is used as the side becomes equal to the area of the trapezoid where the inclination is K and the maximum target deceleration Gmax is used as the height. After step S5 is completed, step S6 is performed.

In step S6, the control circuit 130 determines whether the switch detecting the idle state of the accelerator pedal is ON. In this example, when this switch is ON (i.e., when the accelerator pedal is fully released), it is determined that the driver intends to decelerate the vehicle. In step S6, it is determined whether the accelerator pedal is fully released according to the signal transmitted from the accelerator pedal opening amount sensor 113. If it is determined in step S6 that the accelerator pedal is fully released, step S7 is performed. On the other hand, if it is not determined in step S6 that the accelerator pedal is fully released, step S1 is performed again.

In step S7, the control circuit 130 compares the maximum target deceleration Gmax obtained in step S5 with the engine braking force obtained at the present shift speed while the accelerator pedal is fully released, and determines whether the difference is less than the predetermined value. If it is determined that the difference is less than the predetermined value (if it is determined that higher degree of deceleration is required), step S8 is performed. If it is determined that the difference is equal to or greater than the predetermined value, the control routine is reset.

When the accelerator pedal is fully released, the engine braking force obtained at the presently achieved shift speed acts on the vehicle as the deceleration. This is because, if the difference between the engine braking force and the maximum target deceleration Gmax is equal to or greater than the predetermined value, the deceleration control (step S8) is not very effective, and, therefore, the deceleration control need not be performed.

In step S8, the control circuit 130 performs the deceleration control so as to obtain the target deceleration. The control circuit 130 performs deceleration control based on the inclination K and the maximum value (maximum target deceleration Gmax) of the target deceleration obtained in step S5. In step S8, the brake control circuit 230 performs the feedback control of the brake such that the deceleration that actually acts on the vehicle becomes equal to the target deceleration. The feedback control of the brake is started at the point at which the accelerator pedal is fully released.

Namely, at the position at which the accelerator pedal is fully released, the signal indicating the target deceleration starts to be output from the control circuit 130 to the brake control circuit 230 through the braking force signal line L1, as the braking force signal SG1. The brake control circuit 230 prepares the brake control signal SG2 based on the braking force signal SG1 received from the control circuit 130, and outputs the brake control signal SG2 to the hydraulic control circuit 220.

The hydraulic control circuit 220 causes the brake devices 208, 209, 210 and 211 to generate the braking force according to the instruction included in the brake control signal SG2 by controlling the hydraulic pressure supplied to the brake devices 208, 209, 210 and 211 according to the brake control signal SG2.

In the feedback control of the brake apparatus 200 in step S8, the target value is the target deceleration, the control amount is the actual deceleration of the vehicle, the control target is the brake (brake devices 208, 209, 210 and 211), and the operation amount is the brake control amount (not shown). The actual deceleration of the vehicle is detected by the acceleration sensor 90. Namely, the brake apparatus 200 controls the braking force (brake control amount) such that actual deceleration of the vehicle becomes the target deceleration. When the vehicle speed V comes close to the recommended vehicle speed Vreq, the deceleration control in step S8 ends. After step S8 is completed, the control routine ends.

According to the first embodiment described above, the following effects can be obtained. As described above, the target turning vehicle speed (recommended vehicle speed Vreq) is obtained based on the curvature radius R, and the target lateral acceleration G (Gyt) (equation 1), and the deceleration Greqx, which is required to reduce the vehicle speed V to the recommended vehicle speed Vreq while the vehicle moves for the distance L to the starting point of the curve, is expressed by the above equation 2. Because the distance L to the starting point of the curve is included in the denominator in the equation 2, the deceleration Greqx becomes considerably great near the starting point of the curve. It is, therefore, unrealistic to perform the deceleration control such that such considerably great deceleration Greqx acts on the vehicle.

In this case, even if the difference between the present vehicle speed V and the recommended vehicle speed Vreq is small and deceleration is not actually required, a great value is output as the required deceleration Greqx near the starting point of the curve. Also, in the case of a double apex curve, the deceleration needs to be output such that the vehicle can appropriately go round the curve where the higher degree deceleration is required. However, the deceleration suitable for the curve closest to the vehicle is output in any cases. As described so far, there is a problem that the equation 2 can be effectively used only at a position distant from the curve. This problem will be described in detail with reference to FIG. 9.

Figure 9:
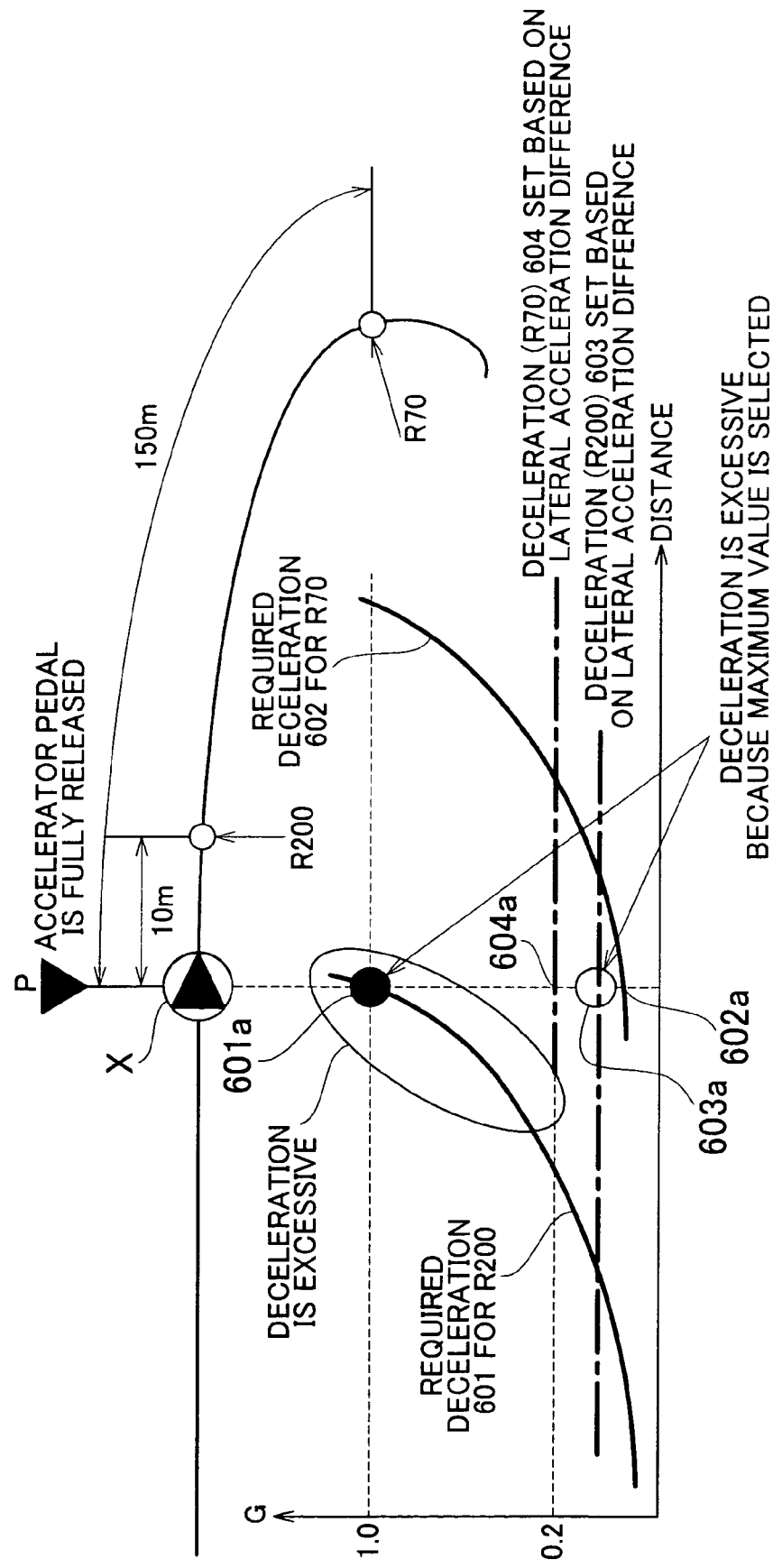
FIG. 9 illustrates the view for describing the effects obtained by the deceleration control apparatus for a vehicle according to the first embodiment of the invention.

FIG. 9 shows the case where the accelerator pedal of the vehicle X is fully released at the point P. At the node closest to the vehicle X in the road ahead of the vehicle X, the curvature radius R is 200 meters and the distance from the point P is 10 meters. At the next node, the curvature radius R is 70 meters and the distance from the point P is 150 meters. The required deceleration Greqx for these nodes are indicated by the respective lines shown by reference numerals 601 and 602, and each required deceleration Greqx becomes considerably greater as the vehicle X comes closer to the corresponding curve (node). If the maximum value is selected from among the deceleration Greqx indicated by the reference numeral 601 and the deceleration Greqx indicated by the reference numeral 602 at the two respective nodes when the accelerator pedal is fully released at the point P, the value indicated by a reference character 601a is selected as the representative required deceleration GreqALL. Because the point P is close to the curve (node) at which the curvature radius R is 200 meters, the required deceleration Greqx for the curve (the reference numeral 601) is a considerably great value.

For the vehicle X in which the accelerator pedal is fully released at the point P, the deceleration control targeted for the curve (node) at which the curvature radius R is 70 meters needs to be performed rather than the deceleration control targeted for the curve (node) at which the curvature radius R is 200 meters. However, if the deceleration control is performed based only on the required deceleration Greqx, as shown by the reference numeral 601*a*, the deceleration control targeted for the curve closest to the vehicle is performed. In addition, the deceleration becomes an excessively great value.

Therefore, in the first embodiment, the equation 3 and 4 are used to calculate the deceleration without using the parameter concerning the distance. The deceleration Greqy obtained based on the lateral acceleration difference $\Delta Gy$, which is the difference between the target lateral acceleration G (Gyt) and the estimated lateral acceleration G (Gyf), cannot be set based on the distance. However, the deceleration Greqy can be set based on the curvature radius R and the vehicle speed (because the lateral acceleration difference $\Delta Gy$ includes the parameters concerning the curvature radius R and the vehicle speed).

The first deceleration Greqx and the second deceleration Greqy for each of the nodes are obtained according to the equation 2 and the equation 3, respectively. Then, the minimum value is selected from among the first deceleration Greqx and the second deceleration Greqy (step S3). Thus, as the representative deceleration Greqi for each node, the first deceleration Greqx calculated according to the equation 2 is selected for the curve that is distant from the host vehicle, and the second deceleration Greqy calculated according to the equation 3 is selected for the curve near the host vehicle. Thus, the optimum deceleration can be calculated independently of the distance to the curve.

The maximum value is selected from among the representative required decelerations Greqi for the respective nodes in the scope of the search (step S4), whereby the representative required deceleration GreqALL for the curve can be calculated. The actual curve is formed of a plurality of curvature radii R including the clothoid curve (easement curve) portion. This can be dealt with by selecting the maximum value from among the representative decelerations Greqi for the respective nodes in the scope of the search. The same method can be applied to the double apex curve.

In the example shown in FIG. 9, the second deceleration Greqy for the node at which the curvature radius R is 200 meters is indicated by the reference numeral 603, and the second deceleration Greqy for the node at which the curvature radius R is 70 meters is indicated by the reference numeral 604. On the assumption that the vehicle speed V is constant, the second deceleration Greqy is a constant value, as indicated by the equations 3 and 4.

The representative deceleration Greqi for the node at which the curvature radius R is 200 meters is obtained by selecting the minimum value from among the deceleration indicated by the reference numeral 601*a* and the deceleration indicated by the reference numeral 603*a*. In this case, the representative deceleration Greqi is set to the deceleration indicated by the reference numeral 603*a*. The representative deceleration Greqi for the node at which the curvature radius R is 70 meters is obtained by selecting the minimum value from among the deceleration indicated by the reference numeral 602*a* and the deceleration indicated by the reference numeral 604*a*. In this case, the representative deceleration Greqi is set to the deceleration indicated by the reference numeral 602*a*. The maximum value is selected from among the representative decelerations Greqi for the respective nodes (the representative deceleration indicated by the reference numeral 602*a* and the representative deceleration indicated by the reference numeral 603*a*), and the representative required deceleration GreqALL is set to the deceleration indicated by the reference numeral 603*a*.

Figure 10:
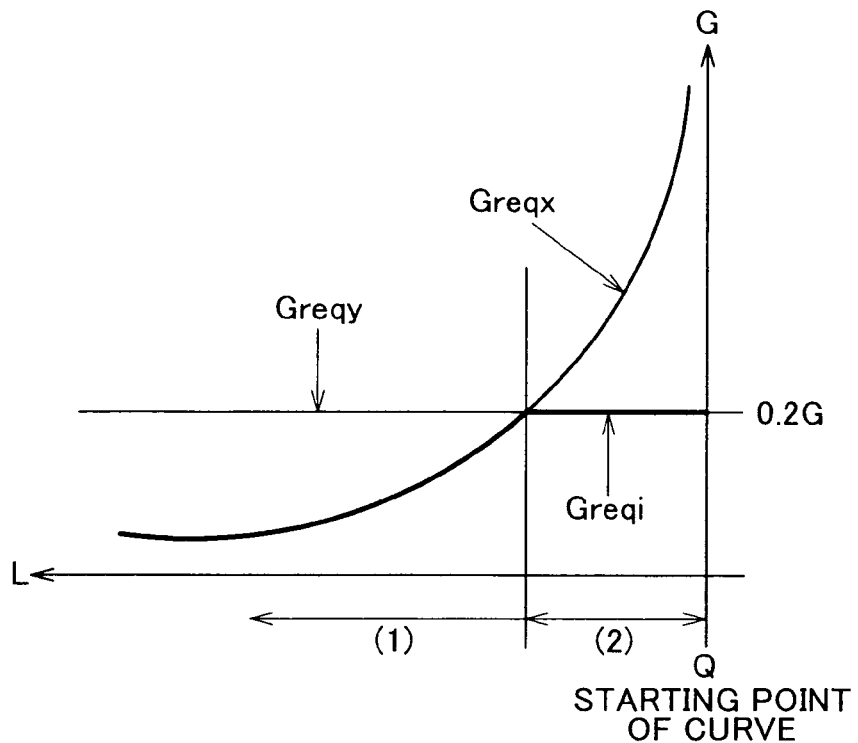
FIG. 10 illustrates the graph for describing the effects obtained by the deceleration control apparatus for a vehicle according to the first embodiment of the invention.
Figure 11:
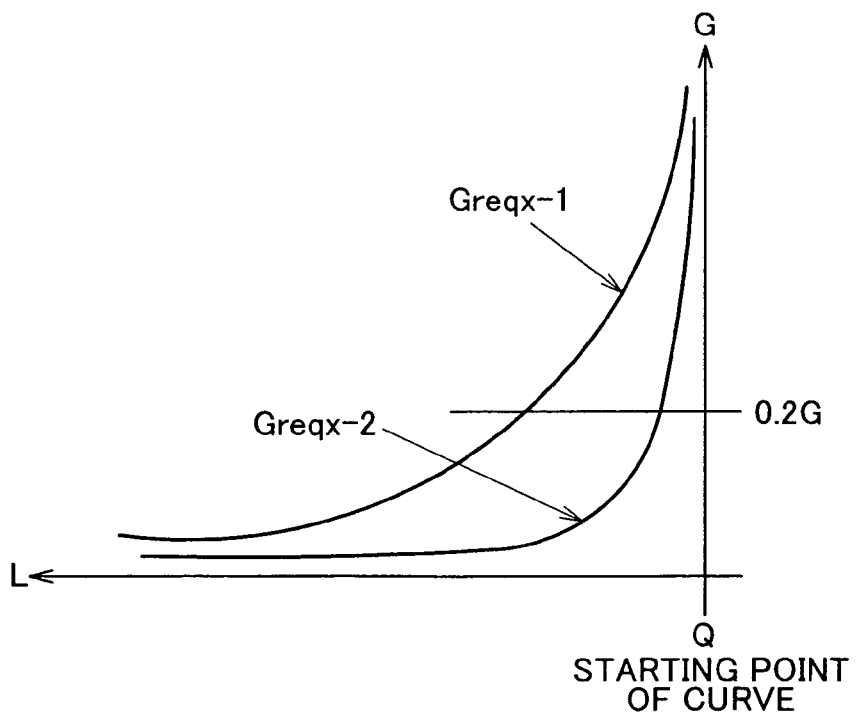
FIG. 11 illustrates another graph for describing the effects obtained by the deceleration control apparatus for a vehicle according to the first embodiment of the invention.

The effect of using the second deceleration Greqy will be further described with reference to FIGS. 10 and 11. As described above, in the first embodiment, the first deceleration Greqx and the second deceleration Greqy are calculated, and the representative deceleration Greqi at the curve (node) is set to the minimum value selected from among the first deceleration Greqx and the second deceleration Greqy. As a result, as shown in FIG. 10, in the region shown by the reference numeral (1), which is distant from the starting point Q of the curve, the representative deceleration Greqi is set to the first deceleration Greqx. In the region shown by the reference character (2), which is near the starting point Q of the curve, the representative deceleration Greqi is set to the second deceleration Greqy. Namely, the second deceleration serves as the guard value such that the first deceleration Greqx that becomes a considerably great value is not selected near the starting point Q of the curve.

As described above, the first deceleration Greqx becomes a considerably great value near the starting point Q of the curve. In order to avoid using such an excessive value near the starting point Q of the curve, the upper limit (guard value) may be set such that the deceleration used in deceleration control does not exceed a predetermined value. FIG. 11 shows the case where the upper limit is set to 0.2 G. In FIG. 11, the reference character Greqx-1 indicates the first deceleration when the vehicle speed V is considerably higher than the recommended vehicle speed Vreq, and the reference character Greqx-2 indicates the first deceleration when the vehicle speed V is slightly higher than the recommended vehicle speed Vreq.

When a uniform guard value is set, even if the vehicle speed V is slightly higher than the recommended vehicle speed Vreq (the first deceleration Greqx-2), the vehicle speed V is reduced at the deceleration of 0.2 G that is the same value as the case where the vehicle speed V is considerably higher than the recommended vehicle speed Vreq (the first deceleration Greqx-1), and, therefore, excessive deceleration acts on the vehicle.

In contrast, when the vehicle speed V is slightly higher than the recommended vehicle speed Vreq, the second deceleration Greqy is set to a less value, than when the vehicle speed V is considerably higher than the recommended vehicle speed Vreq (equations 3 and 4). As a result, the problem described above does not arise.

In the first embodiment, as shown in FIG. 10, the representative deceleration Greqi at each curve (node) is set to the minimum value selected from among the first deceleration Greqx and the second deceleration Greqy. As a result, in the region shown by the reference numeral (1), which is distant from the starting point of the curve, the node representative deceleration Greqi is set to the first deceleration Greqx. In the region shown by the reference character (2), which is near the starting point of the curve, the node representative deceleration Greqi is set to the second deceleration Greqy.

Namely, in the first embodiment, the point at which the node representative deceleration Greqi is switched between the first deceleration Greqx and the second deceleration Greqy is determined based on the result of comparison between the first deceleration Greqx and the second deceleration Greqy. According to this method, the node representative deceleration Greqi is always expressed by the line passing the point at which the first deceleration Greqx intersects with the second deceleration Greqy. Accordingly, the node representative speed Greqi changes smoothly with respect to the change in the distance L to the starting point of the curve. Namely, the problem that the node representative speed Greqi changes without continuity can be avoided.

According to a first modified example of the first embodiment, the point at which the node representative deceleration Greqi is switched between the first deceleration Greqx and the second deceleration Greqy (hereinafter, referred to as the "switching point") can be decided based on the distance to the starting point of the curve (not shown), independently of the result of comparison between the first deceleration Greqx and the second deceleration Greqy. The distance between the switching point and the starting point of the curve may be a predetermined value (a constant value independent of the vehicle speed and the target lateral acceleration G).

Instead of this, the distance between the switching point and the starting point of the curve may be set in the following manner. The first deceleration Greqx and the second deceleration Greqy are calculated based on the vehicle speed V detected when a curve is detected (without taking the change in the vehicle speed after the curve is detected into account). Then, the minimum value is selected from among the calculated first deceleration Greqx and second deceleration Greqy. As a result, the switching point can be set to the point at which the second deceleration Greqy is selected (the distance between the switching point and the starting point of the curve is set to the distance between the point at which the second deceleration Greqy is selected and the starting point of the curve).

A second modified example of the first embodiment will be described with reference to FIG. 12. In the above description of the control method according to the first embodiment, the nodes included in the map information stored in the navigation system 95 are used. However, the control method according to the first embodiment can be performed using map information other than the nodes.

Figure 12:
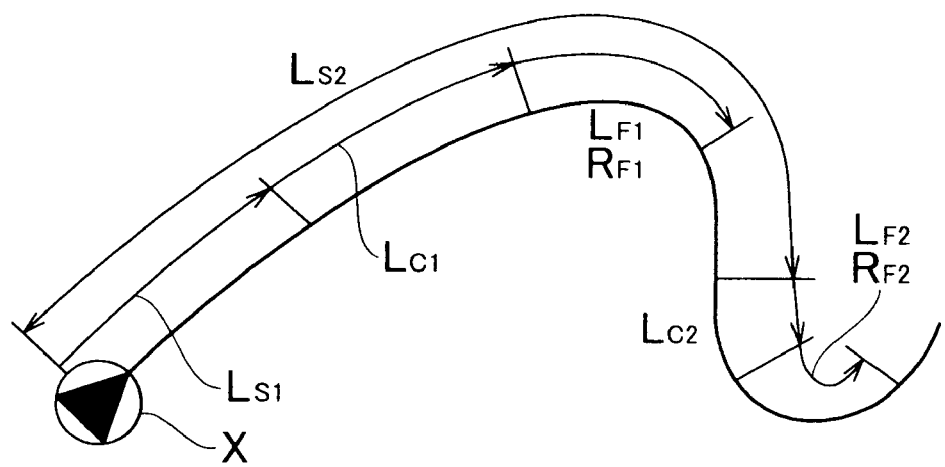
FIG. 12 illustrates the view for describing the deceleration control apparatus for a vehicle according to a second modified example of the first embodiment of the invention.

In FIG. 12, a reference character $L_{Si}$ indicates the length of the straight-line portion of the road, and a reference character $L_{Ci}$ indicates the length of the clothoid curve portion, a reference character $L_{Fi}$ indicates the length of the portion having a constant curvature, and a reference character $R_{Fi}$ indicates the curvature radius R. In the second modified example, the distance to the starting point of the curve (while the vehicle moves for the distance, the vehicle speed should be reduced so as to realize the recommended vehicle speed Vreq at the starting point of the curve) is obtained by adding the distance $L_{Si}$ to the distance $L_{Ci}$. Then, the first deceleration Greqx and the second deceleration Greqy are obtained based on the sum of the distance $L_{Si}$ and the distance $L_{Ci}$ and the curvature radius R ($R_{Fi}$).

Then, the minimum value is selected from among the first deceleration Greqx and the second deceleration Greqy, and representative deceleration Greqi for the curve is set to the selected value. The maximum value is selected from among all the representative decelerations Greqi in scope of the search, and the representative required deceleration GreqALL in the scope of the search is set to the selected value.

In the above description, the distance to the starting point of the curve (while the vehicle moves for the distance, the vehicle speed should be reduced so as to realize the recommended vehicle speed Vreq at the starting point of the curve) is the sum of the distance $L_{Si}$ and the distance $L_{Ci}$. Instead of this, only the distance $L_{Si}$ may by used as the distance to the starting point of the curve. As a result, it is possible to perform the deceleration control only at the straight-line portion of the road.

A third modified example of the first embodiment will be described with reference to FIG. 13. In the first embodiment, the second deceleration Greqy is obtained based on the lateral acceleration difference ΔGy. However, the second deceleration Greqy may be obtained based on the estimated lateral acceleration G (Gyf). When the estimated lateral acceleration G (Gyf) is great, the degree to which the vehicle should decelerate is high (in the first embodiment, the target lateral acceleration G (Gyt) used to calculate the lateral acceleration difference ΔGy is a compatible value, and substantially constant value is used).

Figure 13:
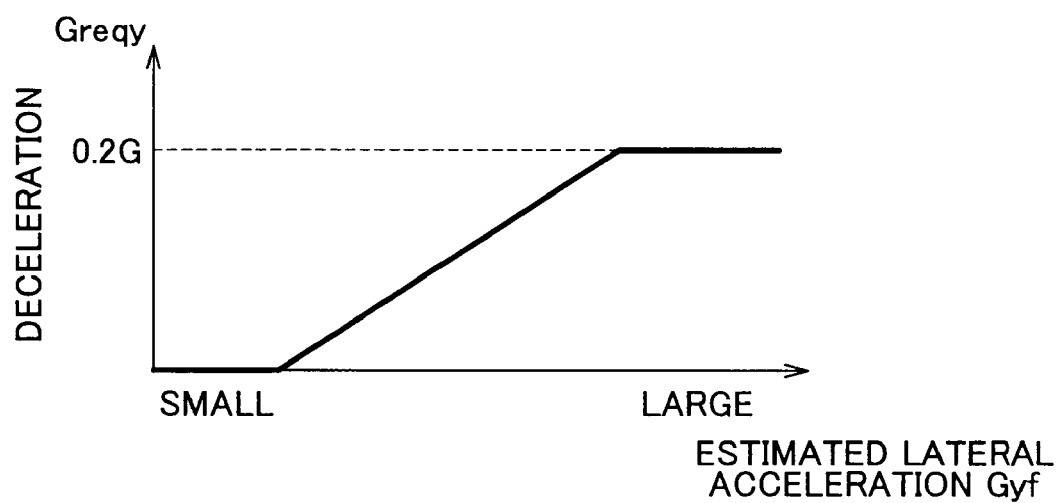
FIG. 13 illustrate the graph for describing the second deceleration used in the deceleration control apparatus for a vehicle according to a third modified example of the first embodiment of the invention.

As shown in FIG. 13, the second deceleration Greqy may be set to increase as the estimated lateral acceleration G (Gyf) increases. However, as in the first embodiment, obtaining the second deceleration Greqy based on the lateral acceleration difference ΔGy would allow the driver to drive the vehicle more comfortably.

Next, a fourth modified example of the first embodiment will be described. In the first embodiment, the estimated lateral acceleration G is obtained according to the equation 4. In contrast, in the fourth modified example, the estimated lateral acceleration G is obtained according to the map using the present vehicle speed V and the curvature radius R, as shown in FIG. 14. The values of the estimated lateral acceleration G set in advance in the map in FIG. 14 are set basically according to the equation 4. In this case, the values of the estimated lateral acceleration G set in advance in the map shown in FIG. 14 may be obtained by correcting the values, obtained according to the equation 4, based on the results of running test, etc.

Next, a fifth modified example of the first embodiment will be described. In the first embodiment, the second deceleration Greqy is obtained based on the lateral acceleration difference ΔGy. In the fifth modified example, as shown in FIG. 15, the second deceleration Greqy may be directly obtained according to the map using the present vehicle speed V and the curvature radius R. The values set in the map in FIG. 15 are set basically according to the equation 4. In this case, the values of the second deceleration Greqy set in advance in the map shown in FIG. 15 may be obtained by correcting the values, obtained according to the equation 4, based on the results of running test, etc.

Next, a sixth modified example of the first embodiment will be described. In the first embodiment, the estimated lateral acceleration G is the lateral acceleration G that is estimated to be detected if the vehicle goes round the curve C at the present vehicle speed V (refer to the equation 4). In the sixth modified example, as the estimated lateral acceleration G, the "lateral acceleration G that is estimated to be detected when the vehicle passes the starting point of the curve" is used instead of the lateral acceleration G that is estimated to be detected if the vehicle goes round the curve C at the "present vehicle speed V". Examples of the lateral acceleration G that is estimated to be detected when the vehicle passes the starting point of the curve are as follows.

When the vehicle passes the starting point of the curve, the vehicle speed at the starting point of the curve is certainly lower than the vehicle speed (the present vehicle speed V) detected when the deceleration control for the curve is started before the curve (including, for example, a decrease in the vehicle speed caused by fully releasing the accelerator pedal). Hereafter, the examples (1) to (4) of the estimated lateral acceleration G will be described.

(1) The first example of the estimated lateral acceleration G will be described. A vehicle speed Va at the starting point of the curve is estimated by multiplying the present vehicle speed V by a coefficient less than 1. Then, the vehicle speed V in the equation 4 is substituted by the estimated vehicle speed Va at the starting point of the curve. Thus, the estimated lateral acceleration G can be obtained.

(2) The second example of the estimated lateral acceleration G will be described. A vehicle speed Vb at the starting point of the curve is estimated by subtracting a predetermined value (for example, 10 Km/h) from the present vehicle speed V. Then, the vehicle speed V in the equation 4 is substituted by the estimated vehicle speed Vb at the starting point of the curve. Thus, the estimated lateral acceleration G can be obtained.

(3) The third example of the estimated lateral acceleration G will be described. In the first example, the coefficient corresponds to the inclination of the road. For example, in the case where the coefficient for the flat road is 0.9, if the road is a downhill slope, the coefficient is a value greater than 0.9, for example, the coefficient is 1.2. On the other hand, if the road is an uphill slope, the coefficient is a value less than 0.9, for example, the coefficient is 0.8. In this case, the coefficient may be variable based on the degree of inclination of the road.

(4) The fourth example of the estimated lateral acceleration G will be described. In the first example, the coefficient corresponds to the vehicle speed V. This is because the degree to which the application the engine brake is effective varies depending on the vehicle speed V. Namely, when the vehicle speed V is high, the rate of decrease in the vehicle speed toward the starting point of the curve is high. On the other hand, when the vehicle speed V is low, the rate of decrease in the vehicle speed toward the starting point of the curve is low. Accordingly, the coefficient can be set to a less value when the vehicle speed V is high, than when the vehicle speed V is low.

Next, a second embodiment of the invention will be described. The second embodiment relates to a deceleration control apparatus for a vehicle that performs the cooperative control of the brake (brake device) and the automatic transmission. In the second embodiment, the same or similar portions as those in the first embodiment will not be described, and only the portions specific to the second embodiment will be described.

Steps S1 to S7 in the second embodiment are the same as those in FIG. 1 in the first embodiment. Only step S8 in the second embodiment is different from that in the first embodiment. Namely, in the first embodiment, the deceleration control is performed such that the deceleration acting on the vehicle becomes the target deceleration obtained in step S5 by using only the brake. In contrast, in the second embodiment, the deceleration control is performed such that the deceleration acting on the vehicle becomes the target deceleration obtained in step S5 due to the cooperative control of the brake and the automatic transmission.

In step S8 in the second embodiment, the control circuit 130 performs both the shift control and the brake control. Hereafter, the description (A) concerning the shift control and the description (B) concerning the brake control will be made.

(A) First, the shift control will be described. In the shift control in step S8, the control circuit 130 obtains the target deceleration obtained by the automatic transmission 10 (hereinafter, referred to as the "shift speed target deceleration"), and the shift speed that should be achieved by the shift control (downshifting) of the automatic transmission 10 is determined. Hereafter, the description (1) and the description (2) concerning the shift control in step S8 will be made.

(1) First, the shift speed target deceleration is obtained. The shift speed target deceleration corresponds to the engine braking force (deceleration) to be obtained by the shift control of the automatic transmission 10. The shift speed target deceleration is set to a value equal to or lower than the maximum target deceleration. The shift speed target deceleration can be obtained in the following three methods.

First, the first method for obtaining the shift speed target deceleration will be described. The shift speed target deceleration is set to a value obtained by multiplying the maximum target deceleration Gmax obtained in step S5 by a coefficient that is greater than 0 and equal to or less than 1. For example, when the maximum target deceleration Gmax is −0.20 G, the shift speed target deceleration is set, for example, to −0.10 G that is obtained by multiplying the maximum target deceleration Gmax of −0.20 G by the coefficient of 0.5.

Figures 16, 17:
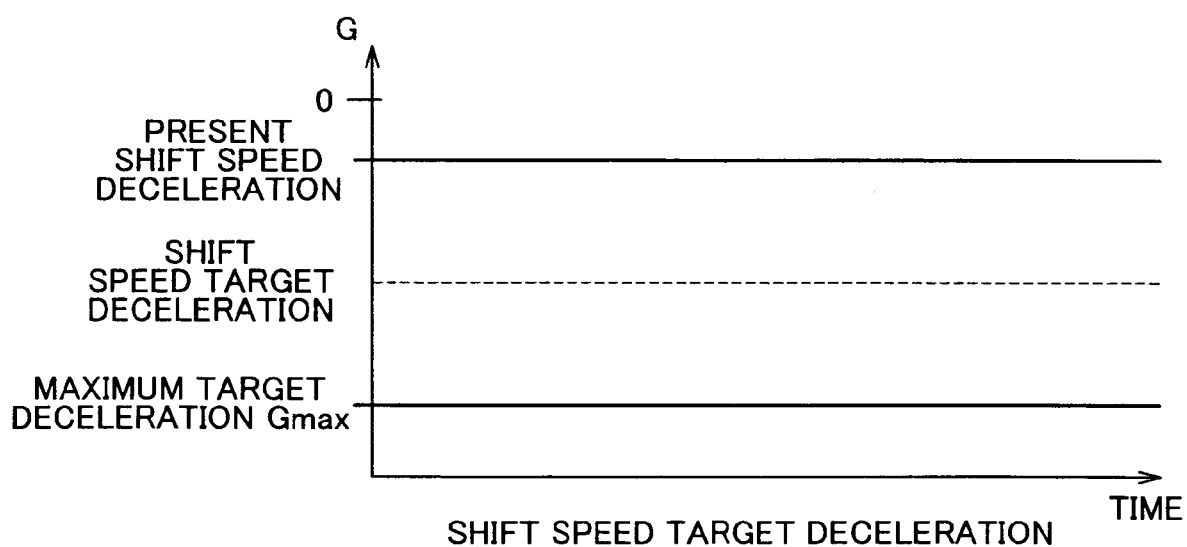
FIG. 16 illustrates the map used for obtaining the deceleration for each combination of the rotational speed of the output shaft of the transmission (corresponding to the vehicle speed) and the shift speed, which is used in the deceleration control apparatus for a vehicle according to a second embodiment of the invention.
FIG. 17 illustrates the graph for describing the shift speed target deceleration used in the deceleration control apparatus for a vehicle according to the second embodiment of the invention.

Next, the second method for obtaining the shift speed target deceleration will be described. First, the engine braking force (deceleration G) when the accelerator pedal is fully released at the present shift speed of the automatic transmission 10 is obtained (hereinafter, referred to as the "present shift speed deceleration"). The present shift speed deceleration map (refer to FIG. 16) is stored in the ROM 133 in advance. The present shift speed deceleration (deceleration) is obtained using the present shift speed deceleration map in FIG. 16. As shown in FIG. 16, the present shift speed deceleration is obtained based on the shift speed and the rotational speed NO of the output shaft 120c of the automatic transmission 10. For example, when fifth speed is presently achieved and the rotational speed of the output shaft 120 is 1000 rpm, the present shift speed deceleration is −0.04 G.

The present shift speed deceleration may be obtained by correcting the value obtained using the present shift speed deceleration map, depending on whether the air-conditioner of the vehicle is operating and whether fuel-cut is performed. Alternatively, a plurality of present shift speed deceleration maps may be stored in the ROM 133 so as to correspond to each of the conditions, for example, the condition where the air conditioner is operating, the condition where the air conditioner is not operating, the condition where the fuel-cut is performed, and the condition where the fuel-cut is not performed. The present shift speed deceleration map to be used may be switched depending on the present condition.

Next, the shift speed target deceleration is set to a value between the present shift speed deceleration and the maximum target deceleration Gmax. Namely, the shift speed target deceleration is set to a value that is greater than the present shift speed deceleration and equal to or less than the maximum target deceleration Gmax. FIG. 17 shows an example of the relationship between the shift speed target deceleration, and the present shift speed deceleration and the maximum target deceleration Gmax.

The shift speed target deceleration can be obtained according to the following equation.

Shift speed target deceleration=(maximum target deceleration Gmax−present shift speed deceleration)×coefficient+present shift speed deceleration In this equation, the coefficient is a value greater than 0 and equal to or less than 1.

In this example, if the maximum target deceleration Gmax is −0.20 G (Gmax=−0.20 G), the present shift speed deceleration is −0.04 G, and the coefficient is 0.5, the shift speed target deceleration is −0.12 G.

The shift speed target deceleration obtained in step S8 is not changed to a new value until the deceleration control ends.

As shown in FIG. 17, the shift speed target deceleration (the value indicated by the dashed line) does not change with time.

Figure 18:
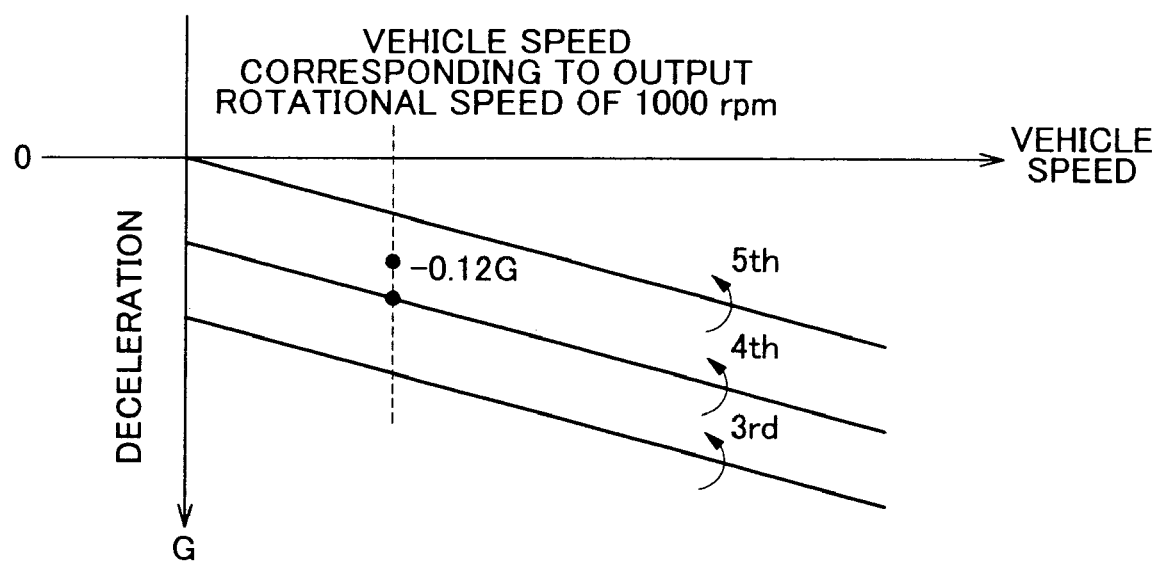
FIG. 18 illustrates the graph showing the shift speeds corresponding to the rotational speed of the output shaft of the transmission (corresponding to the vehicle speed) and the deceleration, which is used in the deceleration control apparatus according to the second embodiment of the invention.

(2) Next, the shift speed that should be achieved by the shift control of the automatic transmission 10 is determined based on the shift speed target deceleration obtained according to the equation in the description (1). The ROM 133 stores the data, shown in FIG. 18, concerning the features of the vehicle, which indicates the deceleration G for the vehicle speed corresponding to each shift speed when the accelerator pedal is fully released.

As in the above example, if the rotational speed of the output shaft is 1000 rpm and the shift speed target deceleration is −0.12 G, the shift speed, which corresponds to the vehicle speed achieved when the rotational speed of the output shaft is 1000 rpm and at which the deceleration closest to the shift speed target deceleration of −0.12 G can be obtained, is fourth speed. Thus, in the above example, the shift speed to be selected in the shift control in step S8 is fourth speed. The shift control in step S8 (output of a command for downshifting to the shift speed to be selected) is performed at the point at which the accelerator pedal is fully released.

Here, the shift speed, at which the deceleration closest to the shift speed target deceleration can be obtained, is the shift speed that should be selected. However, the shift speed that should be selected may be the shift speed at which the deceleration is equal to or lower (or higher) than the shift speed target deceleration and is the closest to the shift speed target deceleration.

(B) Hereafter, the brake control will be described. In the brake control in step S8, the brake control circuit 230 performs the feedback control of the brake such that the actual deceleration acting on the vehicle becomes the target deceleration. The feedback control of the brake is performed at the point at which the accelerator pedal is fully released.

Namely, the signal indicating the target deceleration, that is, the barking force signal SG1, starts to be output from the control circuit 130 to the brake control circuit 230 through the braking force signal line L1, at the point at which the accelerator pedal is fully released. The brake control circuit 230 prepares the brake control signal SG2 based on the braking force signal SG1 received from the control circuit 130, and outputs the brake control signal SG2 to the hydraulic control circuit 220.

The hydraulic control circuit 220 causes the brake devices 208, 209, 210 and 211 to generate the braking force according to the instruction included in the brake control signal SG2 by controlling the hydraulic pressure supplied to the brake devices 208, 209, 210 and 211 according to the brake control signal SG2.

In the feedback control performed by the brake apparatus 200 in the brake control in step S8, the target value is the target deceleration, the control amount is the actual deceleration of the vehicle, the target control is the brake (brake devices 208, 209, 210 and 211), the operation amount is the brake control amount (not shown), and the disturbance is mainly the deceleration obtained by a change in the shift speed of the automatic transmission 10 made by the shift control in step S8. The actual deceleration of the vehicle is detected by the acceleration sensor 90.

Namely, the brake apparatus 200 controls the braking force (brake control amount) such that the actual deceleration of the vehicle becomes the target deceleration. The deceleration obtained by changing the shift speed of the automatic transmission 10 in step S8 may be insufficient. In such a case, the brake control amount is set such that the deceleration corresponding to the shortfall in the deceleration is generated and the target deceleration acts on the vehicle.

In the second embodiment, the example where the cooperative control of the automatic brake and downshifting is performed is described as the deceleration control in step S8. However, the deceleration control in step S8 is not limited to this. The deceleration may be generated by a CVT or a regenerative brake. Alternatively, the shift control for determining the degree of downshifting may be independently performed based on the maximum target deceleration Gmax.

Figure 19:
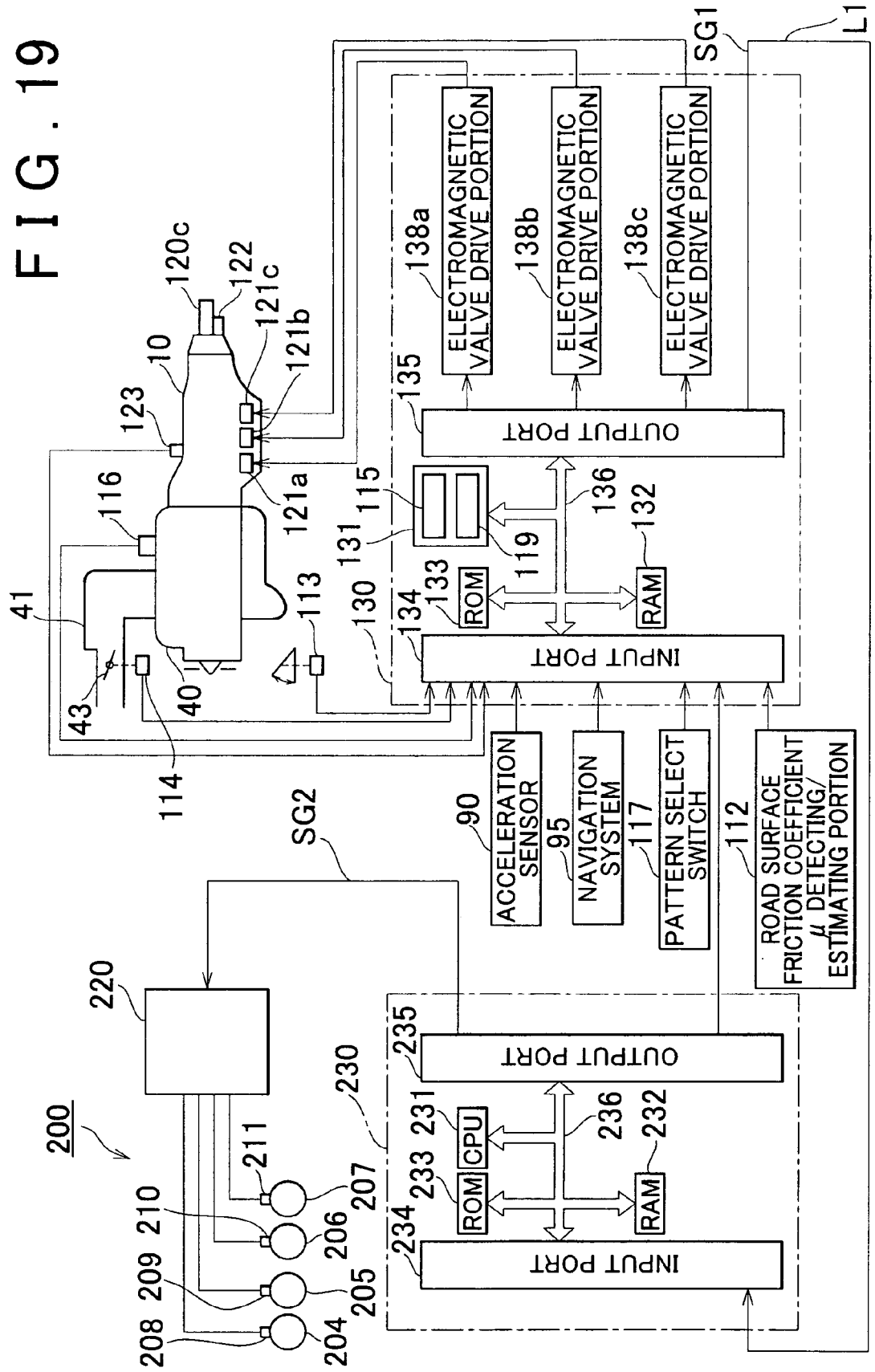
FIG. 19 illustrates the schematic view of the deceleration control apparatus for a vehicle according to a third embodiment of the invention.

Next, a third embodiment will be described with reference to FIG. 19. In the third embodiment, only the portions that are different from those in the above-mentioned embodiments will be described. In the above-mentioned embodiments, the target lateral acceleration G (Gyt) is the compatible value set based on the results of experiments and experience. In the third embodiment, the target lateral acceleration G is set to a value variable depending on the running conditions such as the running environment (weather, the frictional coefficient μ of the road surface), the running mode desired by the driver, and driving skill of the driver. Thus, the deceleration according to the intention of the driver or the deceleration appropriate for the road conditions is calculated. Because the recommended vehicle speed Vreq can be changed by changing the value of the target lateral acceleration G, the first deceleration Greqx can be changed, and the second deceleration Greqy can be also changed.

Hereafter, the configuration according to the third embodiment will be described with reference to FIG. 19. As shown in FIG. 19, a deceleration control apparatus according to the third embodiment has the same configuration as that in the first embodiment, and further includes a road surface friction coefficient μ detecting/estimating portion 112, a running mode estimating portion 115, and a driving skill estimating portion 119.

The road surface friction coefficient μ detecting/estimating portion 112 detects or estimates the friction coefficient μ of the road surface or the slipperiness of the road surface. The road surface friction coefficient μ detecting/estimating portion 112 detects or estimates the friction coefficient μ of the road surface, or the slipperiness of the road surface based on the operating state of a wiper, the outside air temperature, the operating states of ABS, TRC and VSC, and the slip ratio of the tire. The control circuit 130 receives the signal indicating the result of detection/estimation performed by the road surface friction coefficient μ detecting/estimating portion 112.

As shown in FIG. 20, the control circuit 130 changes the target lateral acceleration G based on the slipperiness and according to the signal received from the road surface friction coefficient μ detecting/estimating portion 112. If it is determined that the road is considerably slippery (snow road, frozen road), the target lateral acceleration G is set to 0.25. If it is determined that the road is slippery (wet road), the target lateral acceleration G is set to 0.3. If it is determined that the road is not slippery (dry road), the target lateral acceleration G is set to 0.4.

The running mode estimating portion 115 may be provided as a part of the CPU 131. The running mode estimating portion 115 estimates the running mode desired by the driver (whether the driver prefers the sports running mode or normal running mode) based on the driving state of the driver and the running state of the vehicle. The running mode estimating portion 115 will be described later in detail. The configuration of the running mode estimating portion 115 is not limited to the configuration described later, as long as the running mode estimating portion 115 estimates the running mode desired by the driver. The sports running mode signifies the mode where a priority is given to the power performance and acceleration, and the response of the vehicle to the operation of the driver is quick.

The running mode estimating portion 115 includes a neutral network NN. In the neutral network NN, each time one of the multiple driving operation related parameters is calculated, the driving operation related parameter is input and calculation for estimating the running mode is started. The running mode estimating portion 115 estimates the running mode desired by the driver based on the output from the neutral network NN.

Figure 21:
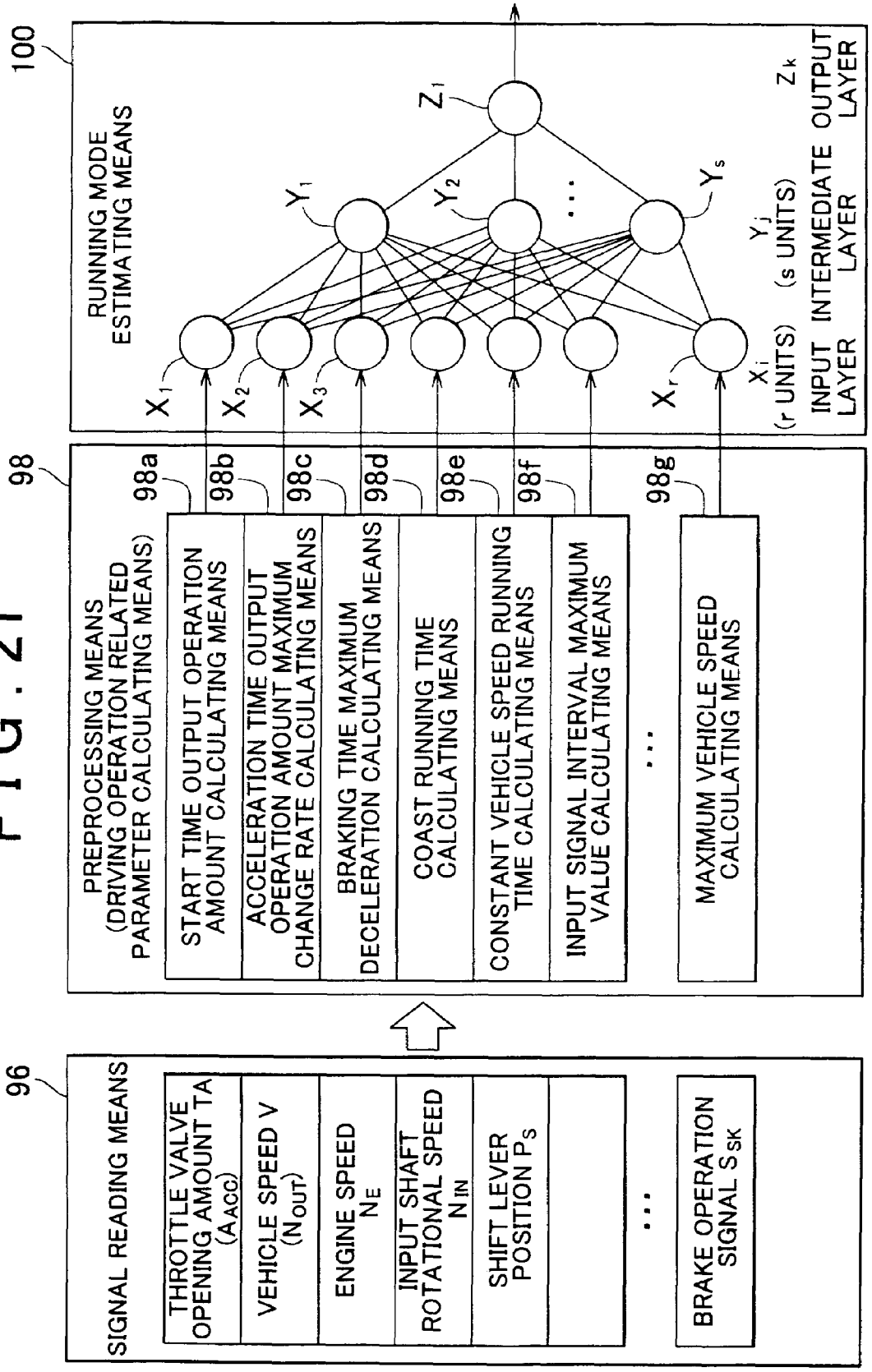
FIG. 21 illustrates the view showing how the running mode desired by the driver is estimated in the deceleration control apparatus for a vehicle according to the third embodiment of the invention.

For example, as shown in FIG. 21, the running mode estimating portion 115 includes signal reading means 96; preprocessing means 98; and running mode estimating means 100. The signal reading means 96 reads the signals transmitted from the throttle valve opening amount sensor 114, the vehicle speed sensor 122, the engine speed sensor 116, the shift position sensor 123 and the like at predetermined relatively short time intervals. The preprocessing means 98 is driving operation related parameter calculating means for calculating multiple types of the driving operation related parameters closely related to the driving operation reflecting the running mode, according to the signals sequentially read by the signal reading means 96. Namely, the preprocessing means 98 calculates the output operation amount (accelerator pedal operation amount) when the vehicle is started, that is, the throttle valve opening amount TAST when the vehicle is started; the maximum rate of change in the output operation amount when the acceleration operation is performed, that is, the maximum change rate ACCMAX of the throttle valve opening amount; the maximum deceleration GNMAX when the braking operation of the vehicle is performed; the coast running time TCOAST of the vehicle; the vehicle speed constant running time TVCONST, the maximum value of the signals received from each sensor in the predetermined interval, the maximum vehicle speed Vmax after the driver started driving the vehicle. The running mode estimating means 100 includes the neutral network NN where, each time the preprocessing means 98 calculates the driving operation related parameter, the driving operation related parameter is permitted and the calculation for estimating the running mode is performed. The running mode estimating means 100 outputs the running mode estimated value that is output from the neutral network NN.

The preprocessing means 98 in FIG. 21 includes start time output operation amount calculating means 98a for calculating the output operation amount when the vehicle is started, that is, the throttle valve opening amount TAST when the vehicle is started; acceleration time output operation amount maximum change rate calculating means 98b for calculating the maximum change rate of the output operation amount when the acceleration operation is performed, that is, the maximum change rate ACCMAX of the throttle valve opening amount; braking time maximum deceleration calculating means 98c for calculating the maximum deceleration GNMAX when the braking operation of the vehicle is performed; coast running time calculating means 98d for calculating the coast running time TCOAST of the vehicle; constant vehicle speed running time calculating means 98e for calculating the constant vehicle speed running time TVCONST; input signal interval maximum value calculating means 98f for periodically calculating the maximum value from among the signals received from each of the various sensors in the predetermined interval of, for example, three seconds; maximum vehicle speed calculating means 98g for calculating the maximum vehicle speed Vmax after the driver starts driving the vehicle.

As the maximum value from among the signals received in the predetermined interval, which is calculated by the input signal interval maximum value calculating means 98f, the throttle valve opening amount TAmaxt, the vehicle speed Vmaxt, the engine speed NEmaxt, the longitudinal acceleration NOGBWmaxt (negative value in the case of deceleration), or the deceleration GNMAXt (absolute value) is used. The longitudinal acceleration NOGBWmaxt or the deceleration GNMAXt is obtained based, for example, on a rate of change in the vehicle speed V (NOUT).

The neutral network NN included in the running mode estimating means 100 shown in FIG. 21 can be obtained by modeling the nerve cell groups of a living body using the software formed of the computer program or the hardware formed by combining the electronic elements. The neutral network NN is configured as shown in the block of the running mode estimating means 100 in FIG. 21.

In FIG. 21. the neutral network NN is formed of three layers consisting of the input layer, the intermediate layer, and the output layer. The input layer is formed of "r" units of nerve cell element (neuron) Xi (X1 to Xr); the intermediate layer formed of "s" units of nerve cell element Yj (Y1 to Ys); and the output layer formed of "t" units of nerve cell element Zk (Z1 to Zt). To transmit the states of the nerve cell elements from the input layer to the output layer, there are provided transmission element DXij that has the coupling coefficient (weight) WXij and that couples "r" units of nerve cell elements Xi with "s" units of nerve cell elements Yj; and the transmission element DYjk that has the coupling coefficient (weight) WYjk and that couples "s" units of nerve cell elements Yj with "t" units of nerve cell elements Zk.

The neutral network NN is a pattern associator type system that is made to learn the coupling coefficient (weight) WXij, and the coupling coefficient (weight) WYjk by so-called error reverse transmission learning algorithm. The learning is completed in advance by the running test where the value of the driving operation related parameters are made to correspond to the running modes. Accordingly, when the vehicle is assembled, the coupling coefficient (weight) WXij and the coupling coefficient (weight) WYjk are set to fixed values.

The above-mentioned learning is performed in the following manner. Each of a plurality of drivers drives the vehicle in each of various types of road, for example, a high way, a suburb road, a mountain road, and a city road in each of the sports running mode and the normal running mode. The running mode preferred by the driver, which is obtained by the test is used as the teacher signal, and the teacher signal and "n" units of indexes (input signals) obtained by preprocessing the sensor signal are input in the neutral network NN. The teacher signal is obtained by setting each of the running modes to a value from 0 to 1. For example, the normal running mode is expressed by "0", and the sport running mode is expressed by "1". The received signals are normalized to a value from −1 to +1 or from 0 to 1.

Figures 22, 23:
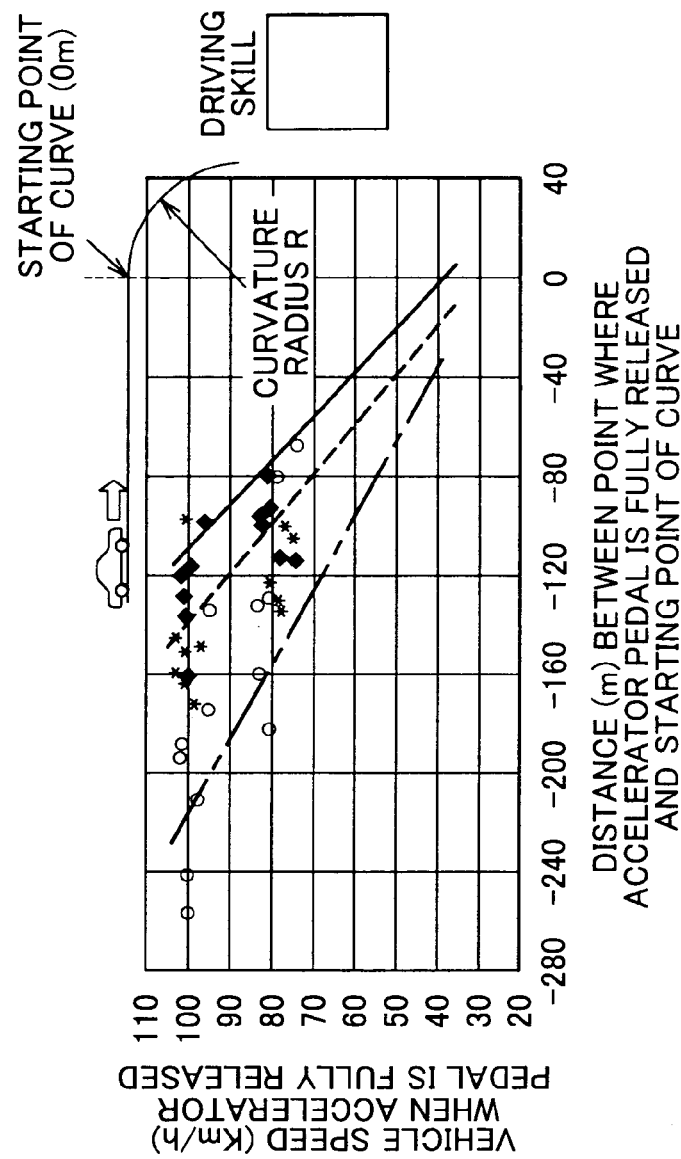
FIG. 22 illustrates the map showing the target lateral acceleration G corresponding to the running modes desired by the driver estimated in the deceleration control apparatus for a vehicle according to the third embodiment of the invention.
FIG. 23 illustrates the graph for describing how the driving skill is estimated in the deceleration control apparatus for a vehicle according to the third embodiment of the invention.

As shown in FIG. 22, the target lateral acceleration G is changed based on the running mode determined by the running mode estimating portion 115. When it is determined that the driver prefers the slow running mode, the target lateral acceleration G is set to 0.3. When it is determined that the driver prefers the normal running mode, the target lateral acceleration G is set to 0.4. When it is determined that the driver prefers the sports running mode, the target lateral acceleration G is set to 0.6.

In the above example, the running mode desired by the driver is estimated by the running mode estimating portion 115. However, the configuration may be such that the driver inputs his/her favorite running mode in the control circuit 130 by operating the switch, or the like.

Next, the driving skill estimating portion 119 will be described. The driving skill estimating portion 119 may be provided as a part of the CPU 131. The driving skill estimating portion 119 estimates the driving skill of the driver based on the received information concerning the driver. In the third embodiment, the configuration of the driving skill estimating portion 119 is not particularly limited, as long as the driving skill of the driver can be estimated. The meaning of the driving skill estimated by the driving skill estimating portion 119 is interpreted in a broad sense.

The driving skill estimating portion 119 estimates the driving skill of the driver based, for example, on the distance between the vehicle and the starting point of the curve detected when the accelerator pedal is fully released, and the vehicle speed. The estimation of the driving skill made by the driving skill estimating portion 119 will be described with reference to FIGS. 23 and 24.

FIG. 23 indicates the time at which the accelerator pedal should be fully released, when the accelerator pedal is fully released and the brake pedal is depressed before the vehicle passes the starting point of the curve. FIG. 23 shows the results of the tests performed on the three drivers having different levels of driving skill.

As shown in FIG. 23, the distance between the point at which the accelerator pedal is fully released (the point at which the driver requests deceleration) and the starting point of the curve depends on the vehicle speed detected when the accelerator pedal is fully released and the driving skill of the driver. For example, if the vehicle speed is 100 km/h when the accelerator pedal is fully released, the beginning driver fully releases the accelerator pedal at the point 220 meters before the starting point of the curve, the intermediate driver fully releases the accelerator pedal at the point 140 meters before the starting point of the curve, and the skilled driver fully releases the accelerator pedal at the point 110 meters before the starting point of the curve.

The test result in FIG. 23 shows that the more unskilled driver fully releases the accelerator pedal at the point further from the starting point of the curve, and the more skilled driver fully releases the accelerator pedal at the position closer to the starting point of the curve. If the vehicle speed when the accelerator pedal is fully released is low, the accelerator pedal is fully released at the point relatively close to the starting point of the curve. However, the above-mentioned tendency of the driving skill (beginning driver, the intermediate driver, or the skilled driver) and the distance between the point at which the accelerator pedal is fully released and the starting point of the curve does not change.

The distance between the point at which the accelerator pedal is fully released and the starting point of the curve is independent of the degree of the curvature radius R when the vehicle passes the starting point of the curve (FIG. 23 includes three types of data where the degrees of the curvature radius R are different). Accordingly, the driving skill can be estimated based on the distance between the point at which the accelerator pedal is fully released and the starting point of the curve, and the vehicle speed detected when the accelerator pedal is fully released. FIG. 24 illustrates the table used to determine the driving skill of the driver.

According to the driving skill determining table in FIG. 24, as the vehicle speed $V_0$ detected when the accelerator pedal is fully released becomes lower, it is determined that the driver is a less skilled driver; and as the vehicle speed $V_0$ becomes higher, it is determined that the driver is a more skilled driver. Also, as the distance $L_0$ between the point at which the accelerator pedal is fully released and the starting point of the curve becomes longer, it is determined that the driver is a less skilled driver; and as the distance $L_0$ becomes shorter, it is determined that the driver is a more skilled driver. In FIG. 24, the driving skill is divided into three levels. However, the driving skill may be divided into four or more levels depending on the control performed based on the estimated driving skill.

The driving skill estimated in the third embodiment is the value indicating the level of driving skill of the driver driving the vehicle that is going round the curve. Namely, the driving skill estimated in the third embodiment is not the absolute driving skill of the driver but the driving skill corresponding to the running mode desired by the driver to appropriately go round the curve.

The following description will be made by taking a driver M (not shown) having the advanced level of driving skill as an example. Because the driver M has the advanced level of driving skill, usually, the vehicle speed $V_0$ at the point at which the accelerator pedal is fully released is high (for example, 70 km/h), and the distance $L_0$ between the point at which the accelerator pedal is fully released and the starting point of the curve is short (for example, −90 m) (see FIG. 24). If the driver M happens to intend to drive the vehicle to slowly go round a curve Z (not shown), and, therefore, the vehicle speed $V_0$ at the point at which the accelerator pedal is fully released is low (for example, 50 km/h), and the distance $L_0$ between the point at which the accelerator pedal is fully released and the starting point of the curve Z is long (for example, −250 m), it is determined that the driver M is a beginning driver based on the driving skill determination table in FIG. 24, and the corner control for the beginning driver is performed. It is, therefore, possible to perform the deceleration control corresponding to the driving skill of the driver (including the running mode desired by the driver for the curve) reflected on the vehicle speed $V_0$ at the point at which the accelerator pedal is fully released and the distance $L_0$ between the point at which the accelerator pedal is fully released and the starting point of the curve. As a result, the drivability of the driver improves.

As shown in FIG. 25, the target lateral acceleration G can be changed based on the driving skill determined by the driving skill estimating portion 119. When it is determined that the driver is a beginning driver, the target lateral acceleration G is set to 0.3. When it is determined that the driver is an intermediate driver, the target lateral acceleration G is set to 0.4. When it is determined that the driver is an advanced driver, the target lateral acceleration G is set to 0.6.

In the above example, the driving skill of the driver is estimated by the driving skill estimating portion 119. However, the configuration may be such that the driver inputs his/her driving skill in the control circuit 130 by operating the switch, or the like.

In the above example, the slipperiness of the road surface, the running mode desired by the driver and the driving skill of the driver are determined independently of each other. However, the slipperiness of the road surface, the mode desired by the driver and the driving skill of the driver may be used in combination. The example where the slipperiness of the road surface, the mode intended by the driver and the driving skill of the driver are used in combination will be described below.

First, the slipperiness of the road surface is determined by the road surface friction coefficient μ detecting/estimating portion 112. As a result of the determination, if it is determined that the road surface is slippery, the target lateral acceleration G is set to 0.3 G. If is it determined that the road surface is very slippery, the target lateral acceleration G is set to 0.25 G. On the other hand, if it is determined that the road surface is not slippery, the target lateral acceleration G is obtained based on the running mode desired by the driver and the driving skill of the driver according to the map shown in FIG. 26.

In the above examples, the target lateral acceleration G is changed based on at least one of the slipperiness of the road surface, the running mode desired by the driver and the driving skill of the driver. However, the configuration may be such that at least one of the first deceleration Greqx and the second deceleration Greqy, instead of the target lateral acceleration G, is be changed based on at least one of the slipperiness of the road surface, the running mode desired by the driver and the driving skill of the driver.

Next, a fourth embodiment will be described with reference to FIG. 27. In the fourth embodiment, only the portions different from those in the above-mentioned embodiments will be described. In the above-mentioned embodiments, a stepped automatic transmission is used. However, in the fourth embodiment, a continuously variable transmission (CVT) is used. Japanese Patent Application Publication No. JP-A-2003-202071 describes the technology related to the control apparatus for a continuously variable transmission, in which the shift speed of the continuously variable transmission is controlled to allow the vehicle to stably go round the curve.

In Japanese Patent Application Publication No. JP-A-2003-202071, the target input shaft rotational speed of the CVT is set based on the distance between the vehicle and the starting point of the curve. Accordingly, if the distance to the starting point of the curve is short, the vehicle speed sometimes needs to be changed rapidly, making it difficult to control the shift speed of the continuously variable transmission. The fourth embodiment is realized mainly to solve such a problem.

First, the description will be made on the commonly employed method for obtaining the target input rotational speed (Nint) of the CVT in the corner control using the CVT. The target input rotational speed Nint of the CVT (hereinafter, referred to as the "final target input rotational speed Nint") is set based on the target input rotational speed Nint' obtained based on the running condition (including the accelerator pedal operation amount and the vehicle speed) and the lower limit input rotational speed corresponding to the degree of deceleration obtained by the corner control. As the final target input rotational speed Nint increases, the engine braking force increases.

Namely, when the lower limit input rotational speed is higher than the target input rotational speed Nint', the final target input rotational speed Nint is set to the lower limit input rotational speed. On the other hand, when the lower limit input rotational speed is equal to or lower than the target input rotational speed Nint', the final target input rotational speed Nint is set to the target input rotational speed Nint'.

Basically, the input rotational speed (shift speed) of the CVT is controlled based on the target deceleration Greqx obtained according to the equation 2. More specifically, as shown in FIG. 27, the lower limit input rotational speed (Na1, Na2, Na3 ... in FIG. 27) is obtained by using the map using the vehicle speed and the target deceleration Greqx (referred to as the "first map"). If the final target input rotational speed Nint is set based on the lower limit input rotational speed obtained using the first map in FIG. 27, the deceleration obtained due to shifting performed by the CVT becomes a considerably great value near the starting point of the curve (see FIG. 4), and cannot be used as a realistic index value.

Therefore, the final target input rotational speed Nint may be set in another method described below. As shown in FIG. 28, the lower limit input rotational speed (Nb1, Nb2, Nb3 ... in FIG. 28) is obtained according to the map using the curvature radius R of the curve and the vehicle speed (referred to as the "second map"). The final lower limit input rotational speed is set to the minimum value selected from among the lower limit input rotational speed (Nb1, Nb2, Nb2 ... in FIG. 28) obtained using the second map and the lower limit input rotational speed (Na1, Na2, Na3 ... in FIG. 27) obtained using the first map.

However, this method has the problem that the accuracy in setting the deceleration is low. Also, because the value input in the second map is the compatible value obtained by repeatedly performing the running tests of the vehicle (because the value input in the second map is not the value calculated according to the equation), it takes a long time to obtain the compatible value by repeatedly perform the tests. In the map, a limited number of ranges need to be provided in each of rows and columns. For example, in the second map, each of the curvature radius R and the vehicle speed needs to be divided into four ranges (large, relatively large, relatively small, small). Using such a map causes a problem that each of the curvature radius R and the vehicle speed needs to be divided into a limited number of ranges. As a result, the following problem arises. The same lower limit input rotational speed is obtained for all the curvature radii R or all the vehicle speeds in the same range, even if the values significantly differ from each other in the range. In such a case, the accuracy in setting the deceleration becomes low. The lower limit input rotational speed input in the map is not calculated according to the equation. The lower limit rotational speed obtained by repeatedly performing the running tests needs to be set/input in each of a plurality of cells in the map. This causes a problem that it takes longer to prepare the map. The fourth embodiment is realized mainly to solve such a problem.

Figure 29:
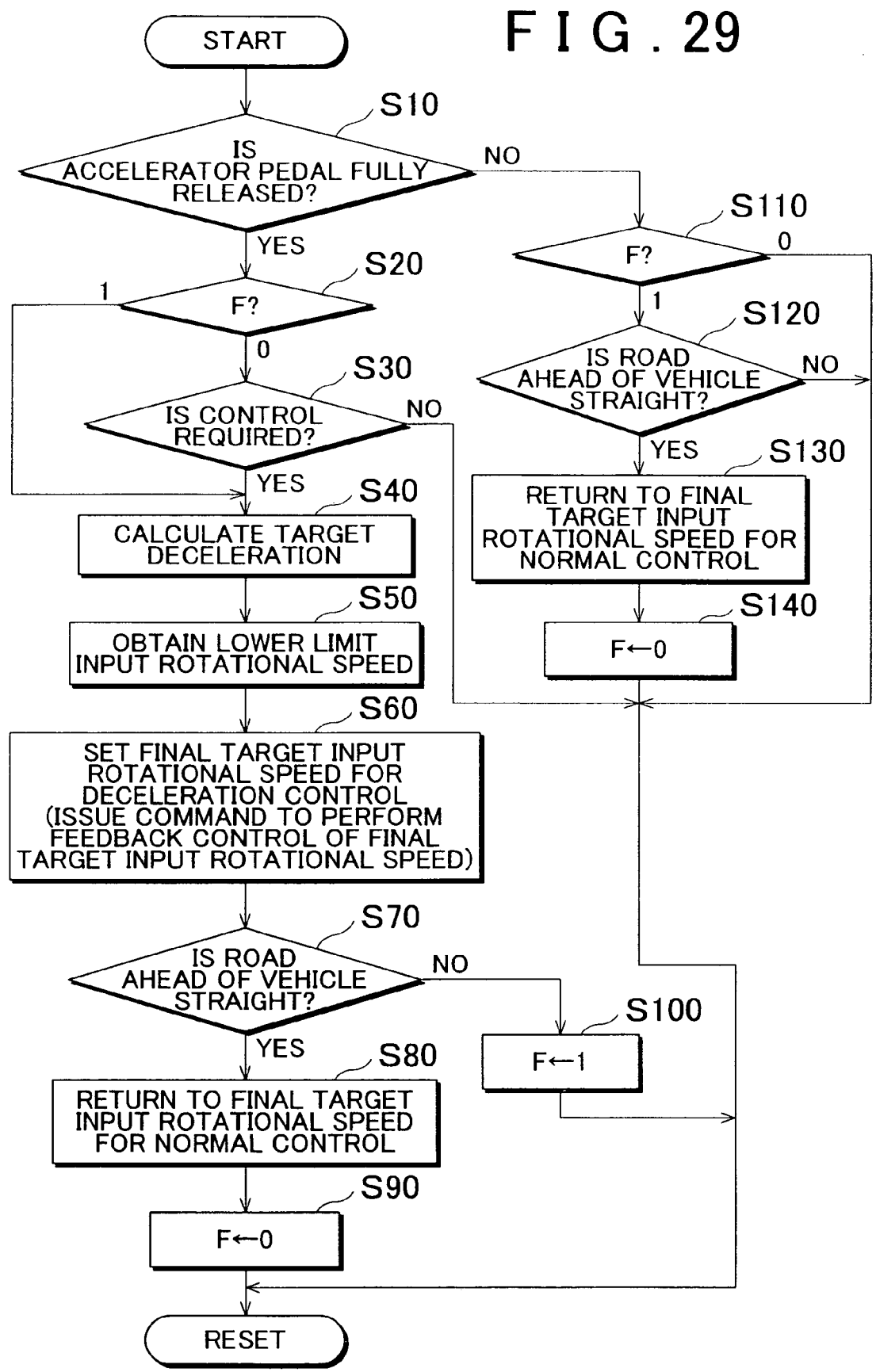
FIG. 29 illustrates the flowchart showing a part of the control routine performed by the deceleration control apparatus for a vehicle according to the fourth embodiment of the invention.
Figure 30:
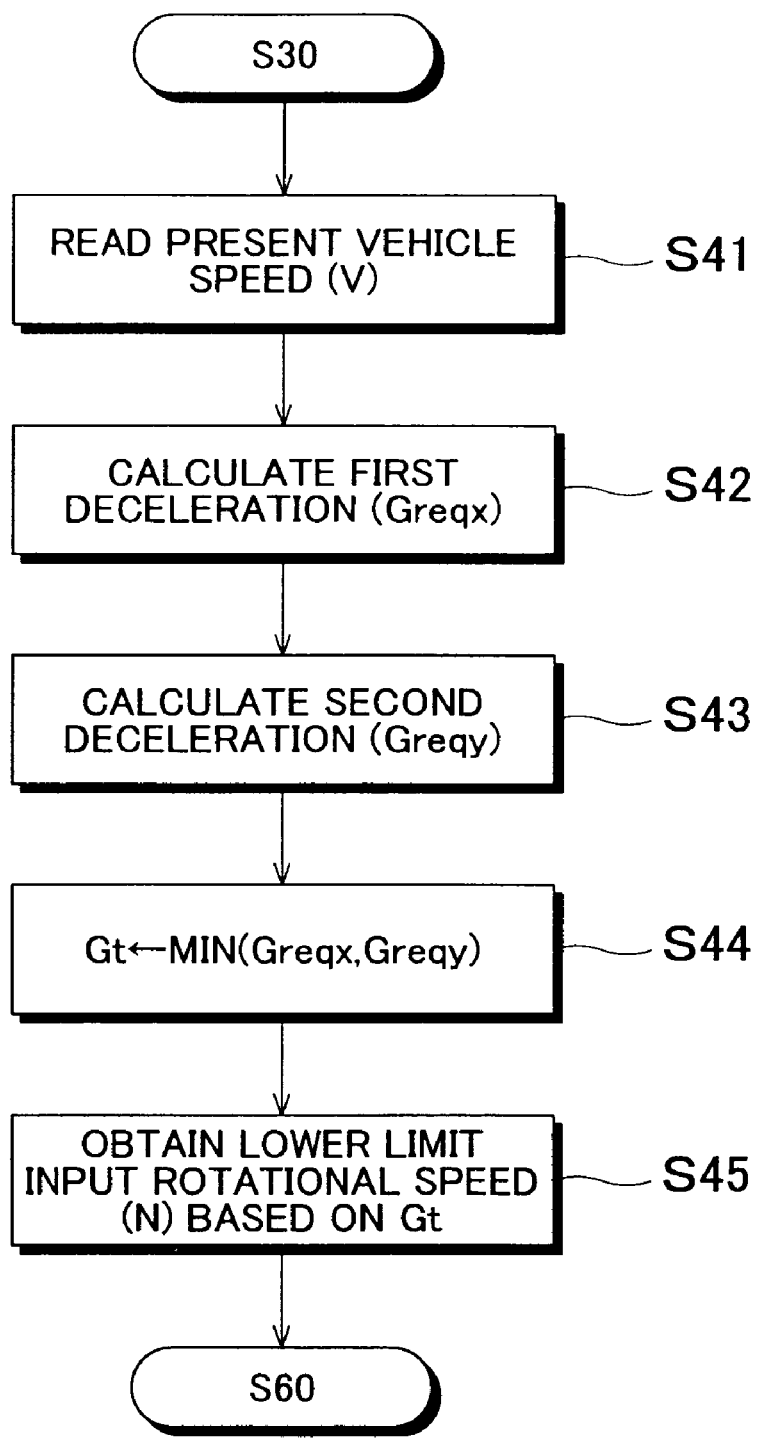
FIG. 30 illustrates the flowchart showing another part of the control routine performed by the deceleration control apparatus for a vehicle according to the fourth embodiment of the invention.
Figure 32:
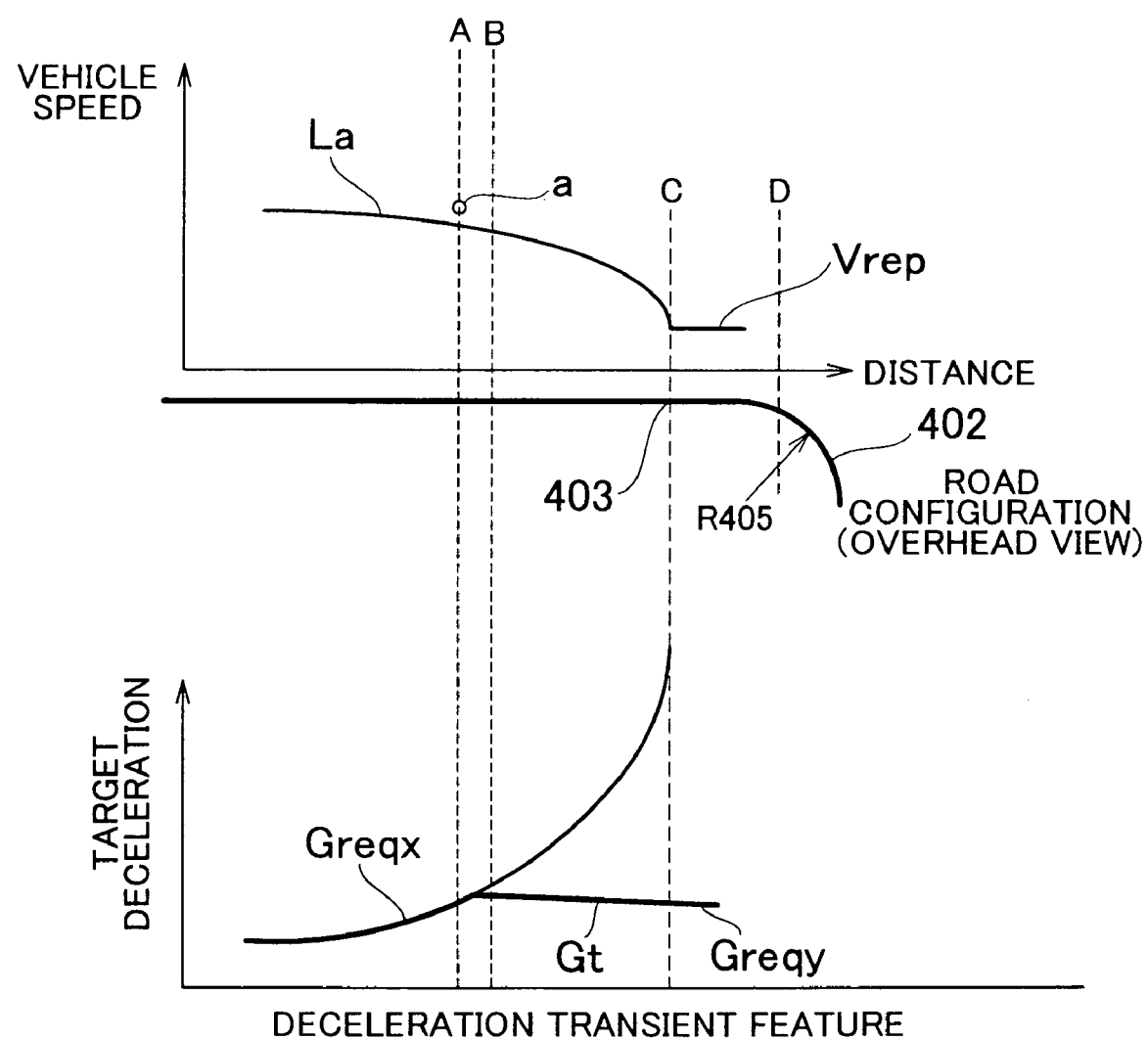
FIG. 32 illustrates the graph for describing the effects of the deceleration control apparatus for a vehicle according to the fourth embodiment of the invention.

Next, the control routine according to the fourth embodiment will be described with reference to FIGS. 29 and 30. FIG. 32 is the chart for describing the deceleration control according to the fourth embodiment. FIG. 32 shows the control execution boundary La, the first deceleration Greqx, the second deceleration Greqy, the target turning vehicle speed Vreq, the road configuration viewed from the above, and the point "a" at which the accelerator pedal is fully released. The first deceleration Greqx and the second deceleration Greqy in FIG. 32 are obtained in the above-mentioned method. In FIG. 32, the second deceleration Greqy decreases as the distance from the point "a" at which the accelerator pedal is fully released increases due to the fact that, when the accelerator pedal is fully released, the vehicle speed decreases.

In step S10, it is determined whether the accelerator pedal is fully released. If it is determined in step S10 that the accelerator pedal is fully released, step S20 is performed. If the accelerator pedal is fully released ("YES" in step S1), it is determined that the driver has an intention to decelerate the vehicle, and the deceleration control according to the fourth embodiment is performed. On the other hand, if it is not determined that the accelerator pedal is fully released, step S110 is performed. As described above, in FIG. 32, the accelerator pedal is fully released at the point indicated by the reference character "a". At the point "a", the shift speed is sixth speed.

In step S20, the flag F is checked. If the flag F indicates "0", step S30 is performed. If the flag F indicates "1", step S40 is performed. Because the flag F indicates "0" when the control routine is initially started, step S30 is performed.

In step S30, it is determined whether the control needs to be performed, using, for example, the control execution boundary La. If the point indicating the relationship between the present vehicle speed and the distance to the starting point 403 of the curve 402 is located above the control execution boundary La, it is determined that the control needs to be performed. On the other hand, if this point is located below the control execution boundary La, it is determined that the control need not be performed. If it is determined in step S30 that the control needs to be performed, step S40 is performed. On the other hand, if it is determined in step S30 that the control need not be performed, the routine is reset.

The control execution boundary La corresponds to the lower limit of the range of the relationship between the present vehicle speed and the distance to the starting point 403 of the curve 402. If the point indicating the relationship is within the range, the target turning vehicle speed Vreq cannot be achieved at the starting point 403 of the curve 402 (the vehicle cannot go round the curve 402 at the target lateral acceleration G) unless the deceleration, which exceeds the deceleration obtained by performing the predetermined normal braking operation, acts on the vehicle. Namely, if the point indicating the relationship is located above the control execution boundary La, the deceleration, which exceeds the deceleration obtained by performing the predetermined normal braking operation, must act on the vehicle to achieve the target turning vehicle speed Vreq at the starting point 403 of the curve 402.

If the point indicating the relationship is located above the control execution boundary La, the driving force control corresponding to the curvature radius R according to the fourth embodiment is performed (step S60). Accordingly, the target turning vehicle speed Vreq can be achieved at the starting point 403 of the curve 402 due to an increase in the deceleration, even if the driver does not operate the brake at all or even if the operation amount of the brake is relatively small (even if the driver slightly depresses the foot brake).

As the control execution boundary La according to the fourth embodiment, the commonly used control execution boundary used for the shift point control for the curvature radius R can be used without any modifications. The control execution boundary La is prepared by the control circuit 130 based on the data indicating the curvature radius R405 of the curve 402 and the distance to the starting point of the curve received from the navigation system 95.

In the fourth embodiment, in FIG. 32, the point corresponding to the reference character "a" at which the accelerator pedal is fully released is located above the control execution boundary La. Accordingly, it is determined that the control needs to be performed ("YES" in step S30), and step S40 is performed.

In step S40, the target deceleration is obtained. Step S40 corresponds to steps S41 to S43 in FIG. 30. First, the present vehicle speed is read in step S41. Then, the first deceleration Greqx is calculated based on the present vehicle speed according to the equations 1 and 2 in step S42. Then, the second deceleration Greqy is calculated based on the present vehicle speed according to equations 3 and 4 in step S43. The second deceleration Greqy may be obtained based on the degree of lateral acceleration G (Gyf), as shown in FIG. 13. After step S40 is completed, step S50 is performed.

In step S50, the lower limit input rotational speed of the CVT is calculated using the map. Step S50 corresponds to step S44 and S45. The minimum value is selected from among the first deceleration Greqx obtained in step S40 (step S42) and the second deceleration Greqy obtained in step S40 (step S43), and the final target deceleration Gt is set to the obtained minimum value in step S44. Next, the lower limit input rotational speed is calculated based on the final target deceleration Gt and the vehicle speed according to the map in FIG. 31, in step S45. After step S50 is completed, step S60 is performed.

In step S60, the final target input rotational speed Nint is set based on the lower limit input rotational speed obtained in step S50. When it is determined that the corner control needs to be performed ("YES" in step S30), since the lower limit input rotational speed is higher than the target input rotational speed Nint', the final target input rotational speed Nint is set to the lower limit input rotational speed (the final target input rotational speed Nint for deceleration control is set).

The feedback control of the final target input rotational speed Nint of the CVT is always performed such that the final target input rotational speed Nint set based on the operating conditions is achieved. Accordingly, in step S60, a command to perform the feedback control of the final target input rotational speed Nint for the deceleration control is substantially issued by setting the final target input rotational speed Nint. After step S60 is completed, step S70 is performed.

In step S70, it is determined whether the road ahead of the vehicle is a straight road (whether there is a curve in the scope of the search). When the control routine is initially performed, it is determined that there is no straight road ahead of the vehicle ("NO" in step S70). Accordingly, the flag F is set to 1 in step S100, after which the control routine is reset. In the control routine performed again, when the accelerator pedal is fully released ("YES" in step S10), the flag F indicates "1" ("1" in step S20). Accordingly, steps S40, S50 and S60 are performed, and the control routine is repeatedly performed until an affirmative determination is made in step S70. If an affirmative determination is made in step S70, step S80 is performed.

In step S80, the final target input rotational speed Nint is switched from the target input rotational speed Nint for deceleration control (lower limit input rotational speed) to the final target input rotational speed Nint for the normal control (target input rotational speed Nint'). Namely, if the road ahead of the vehicle is a straight road ("YES" in step S70), it is not necessary to cause the final target deceleration Gt for the corner control to act on the vehicle. Accordingly, the final target input rotational speed Nint is set to the target input rotational speed Nint'. Then, the flag F is reset to 0 in step S90, after which the control routine is reset.

Before the deceleration control according to the fourth embodiment is started (flag F=0), if the accelerator pedal is not fully released ("NO" in step S10), the flag F is checked in step S110. If the flag F indicates "0", the control routine is reset. If the flag F indicates "1", it is determined whether the road ahead is a straight road in step S120. If it is determined that the road ahead of the vehicle is not a straight road ("NO" in step S120), the control routine is reset, and repeatedly performed until it is determined that the road ahead of the vehicle is a straight road ("YES" in step S120).

If it is determined in step S120 that the road ahead of the vehicle is a straight road ("YES" in step S120), the final target input rotational speed Nint is switched from the final target input rotational speed Nint for deceleration control (the lower limit input rotational speed) to the final target input rotational speed for the normal control (the target input rotational speed Nint') in step S130. After the flag F is reset to "0" in step S140, the control routine is reset. In the case of the CVT, the feedback control is continuously performed until it is determined that there is no curve ahead of the vehicle. Also, shifting is not limited while the vehicle is going round the curve.

Figure 31:
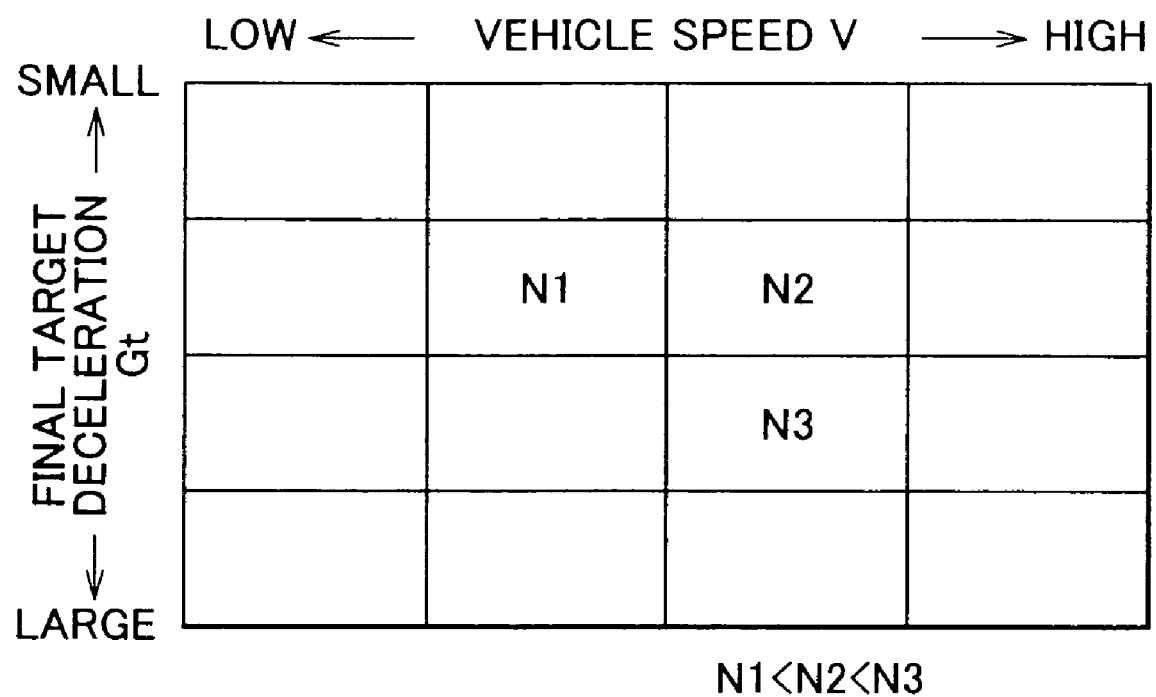
FIG. 31 illustrates the map used in the deceleration control apparatus for a vehicle according to the fourth embodiment of the invention.

Next, a first modified example of the fourth embodiment will be described. In step S45 (FIG. 30) in the fourth embodiment, the lower limit input rotational speed is set based on the final target deceleration Gt and the vehicle speed, as shown in FIG. 31. However, in the first modified example, the lower limit input rotational speed is set based only on the final target deceleration Gt.

Next, a second modified example of the fourth embodiment will be described. In the second modified example, the lower limit input rotational speed or the final target input rotational speed Nint is set with the inclination of the road or the road surface friction coefficient μ taken into account. For example, when the road is an uphill slope, the lower limit input rotational speed with the inclination of the road taken into account can be obtained by multiplying the lower limit input rotational speed set in step S45 by a coefficient less than "1". Thus, when the road is an uphill slope, the deceleration acting on the vehicle can be reduced. Similarly, the lower limit input rotational speed with the road surface friction coefficient μ taken into account can be obtained by multiplying the lower limit input rotational speed by a coefficient corresponding to the road surface friction coefficient μ.

Figure 33:
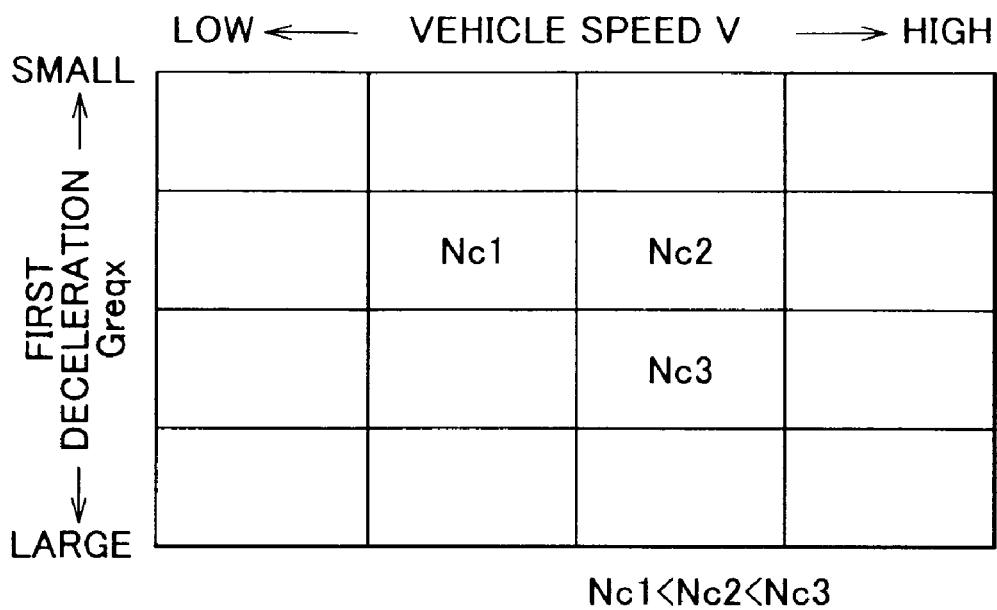
FIG. 33 illustrates the map used in the deceleration control apparatus for a vehicle according a third modified example of the fourth embodiment of the invention.
Figure 34:
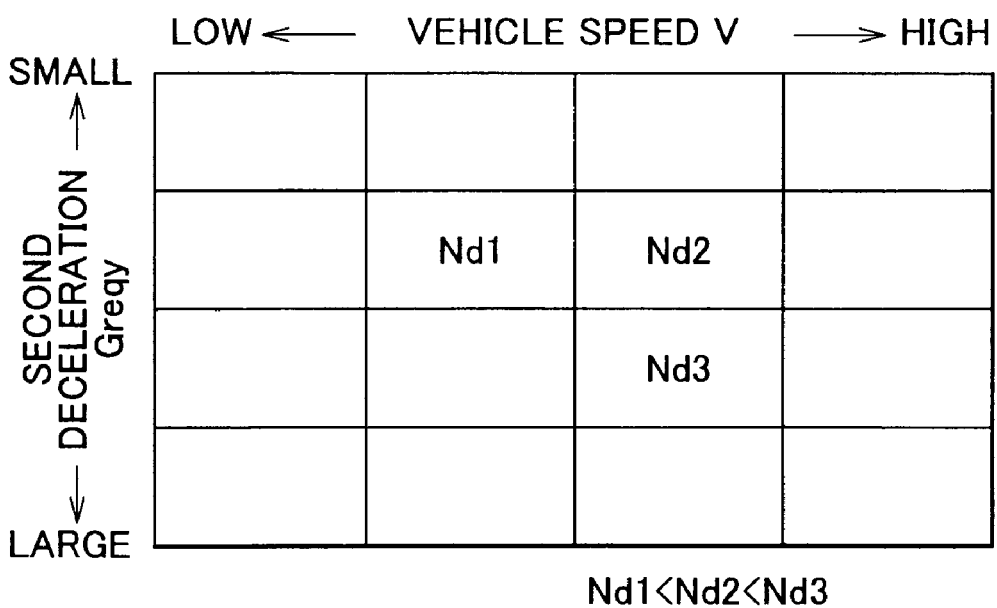
FIG. 34 illustrates another map used in the deceleration control apparatus for a vehicle according to the third modified example of the fourth embodiment of the invention.

Next, a third modified example of the fourth embodiment will be described. In the fourth embodiment, as shown in steps S42 to S45 in FIG. 30, the final target deceleration Gt is set to the minimum value selected from among the first deceleration Greqx and the second deceleration Greqy. Then, as shown in FIG. 31, the lower limit input rotational speed is obtained based on the final target deceleration Gt and the vehicle speed. Instead, in the third modified example, as shown in FIG. 33, the first lower limit input rotational speed (Nc1, Nc2, Nc3 . . . ) is obtained based on the first deceleration Greqx and the vehicle speed. As shown in FIG. 34, the second lower limit input rotational speed (Nd1, Nd2, Nd3 . . . ) is obtained based on the second deceleration Greqy and the vehicle speed. Then, the final lower limit input rotational speed is set to the minimum value selected from among the first lower limit input rotational speed (Nc1, Nc2, Nc3 . . . ) and the second lower limit input rotational speed (Nd1, Nd2, Nd3 . . . ).

The above embodiments and modified examples may be combined as required.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A deceleration control apparatus for a vehicle, comprising:
    a controller configured to perform deceleration control before the vehicle reaches a starting point of an upcoming curve, based on one of a first target declaration control and a second target declaration control,
    wherein the first target deceleration control is determined based on a distance to the starting point of the upcoming curve, when the deceleration control for the curve is started at a position distant from the starting point of the curve; and the second target deceleration control is determined based on a lateral acceleration that is estimated to be detected when the vehicle passes the starting point of the curve, when the deceleration control for the curve is started at a position close to and before the starting point of the curve,
    wherein deceleration amounts of the first target deceleration control are determined based on the distance to the starting point of the curve, and wherein deceleration amounts of the second target deceleration control are not determined based on the distance to the starting point of the curve.

2. The deceleration control apparatus for a vehicle according to claim 1, wherein
    the estimated lateral acceleration is a lateral acceleration that is estimated to be detected if the vehicle goes round the curve at a present vehicle speed.

3. The deceleration control apparatus for a vehicle according to claim 1, wherein
    the estimated lateral acceleration is obtained using a map set in advance based on a vehicle speed and a curvature radius of the curve.

4. The deceleration control apparatus for a vehicle according to claim 1, wherein
    the second target deceleration is obtained using a map set in advance based on a vehicle speed and a curvature radius of the curve.

5. The deceleration control apparatus for a vehicle according to claim 1, wherein
    the first target deceleration and the second target deceleration for each of a plurality of points in a predetermined range in a road ahead of the vehicle are obtained;
    a target deceleration for each of the points is obtained on an assumption that the deceleration control is performed for each of the points based on the corresponding first target deceleration and second target deceleration;
    a target deceleration when the deceleration control is performed for the predetermined range is determined based on the target decelerations for the respective points; and
    the deceleration control is performed based on the determined target deceleration.

6. The deceleration control apparatus for a vehicle according to claim 5, wherein
    a plurality of nodes in road information stored in a navigation system is used as the plurality of points, and a target deceleration for each of the nodes is obtained.

7. The deceleration control apparatus for a vehicle according to claim 1, wherein
    at least one of the first target deceleration and the second target deceleration is variably set based on at least one of a driving skill of a driver, a running mode desired by the driver, and road conditions including slipperiness of a road surface.

8. The deceleration control apparatus for a vehicle according to claim 1, wherein the first target deceleration is based on $$Greqx = \frac{V^2 - Vreq^2}{2 \times L \times g}$$

wherein V is a present vehicle speed; Vreq is a recommended vehicle speed; L is the distance to the starting point of the curve; and g is gravitational acceleration, and
wherein the second target deceleration is based on $$Gyf = \frac{V^2}{R \times g}$$

wherein V is the present vehicle speed; R is the radius of curve; and g is gravitational acceleration.

9. The deceleration control apparatus for a vehicle according to claim 8, wherein at least the distance to a starting point of an upcoming curve and the radius of the upcoming curve is determined from map information stored on a navigation system of the vehicle.

10. The deceleration control apparatus for a vehicle according to claim 1, wherein when a determination is made that a road ahead of the vehicle is substantially straight, a further determination is made as to whether deceleration control is needed, and wherein if a determination is made that the road ahead of the vehicle is not substantially straight, then target deceleration is calculated.

11. The deceleration control apparatus for a vehicle according to claim 10, wherein if an accelerator pedal is not fully released, a determination is not made whether deceleration control is required when the road is substantially straight.

12. A deceleration control apparatus for a vehicle, comprising:
a controller configured to start a deceleration control based on one of a first or a second target deceleration before the vehicle enters an upcoming curve,
wherein the controller is configured to set at least one first deceleration amount according to a first target deceleration control, and wherein the at least one first deceleration amount is determined based on a distance to a starting point of the upcoming curve when the deceleration control is started at a position distant from the starting point of the curve, and
the controller is configured to set at least one second deceleration amount according to a second target deceleration control, wherein the at least one second deceleration amount is determined based on a lateral acceleration that is estimated to be detected when the vehicle passes the starting point of the curve when the deceleration control is started at a position close to and before the starting point of the curve, and wherein the at least one second deceleration amount of the second target deceleration control is not determined based on the distance to the starting point of the curve.

13. The deceleration control apparatus according to claim 12, wherein
the controller calculates the first deceleration amount using a first equation which includes the distance to the curve when the deceleration control is started at a position distant from the starting point of the curve, and calculates the second deceleration amount using a second equation, which is different from the first equation and which includes the estimated lateral acceleration when the deceleration control is started at a position close to the starting point of the curve.

14. The deceleration control apparatus according to claim 13, wherein the first equation includes a target lateral acceleration when the vehicle passes the curve in addition to the distance to the curve, and the target lateral acceleration is different from the estimated lateral acceleration included with the second equation.

* * * * *